US010867587B2

(12) United States Patent
Shibata et al.

(10) Patent No.: US 10,867,587 B2
(45) Date of Patent: Dec. 15, 2020

(54) DISPLAY CONTROL APPARATUS, ELECTRONIC EQUIPMENT, AND CONTROL METHOD OF DISPLAY CONTROL APPARATUS

(71) Applicant: SONY SEMICONDUCTOR SOLUTIONS CORPORATION, Kanagawa (JP)

(72) Inventors: Norie Shibata, Kanagawa (JP); Toshiaki Shino, Tokyo (JP)

(73) Assignees: SONY SEMICONDUCTOR SOLUTIONS CORPORATION, Kanagawa (JP); SONY CORPORATION, Tokyo (JP)

( * ) Notice: Subject to any disclaimer, the term of this patent is extended or adjusted under 35 U.S.C. 154(b) by 0 days.

(21) Appl. No.: 16/334,143

(22) PCT Filed: Sep. 5, 2017

(86) PCT No.: PCT/JP2017/031858
§ 371 (c)(1),
(2) Date: Mar. 18, 2019

(87) PCT Pub. No.: WO2018/079081
PCT Pub. Date: May 3, 2018

(65) Prior Publication Data
US 2019/0279602 A1    Sep. 12, 2019

(30) Foreign Application Priority Data

Oct. 25, 2016   (JP) .................................. 2016-208414

(51) Int. Cl.
*G09G 5/377* (2006.01)
*G09G 5/397* (2006.01)
(Continued)

(52) U.S. Cl.
CPC .............. *G09G 5/377* (2013.01); *G09G 5/00* (2013.01); *G09G 5/397* (2013.01); *G09G 5/399* (2013.01);
(Continued)

(58) Field of Classification Search
CPC .... G09G 5/377; G09G 5/397; G09G 2340/12; G09G 2340/125; G06T 11/60; G06T 19/006
See application file for complete search history.

(56) References Cited

U.S. PATENT DOCUMENTS

2002/0030694 A1\*   3/2002   Ebihara ..................... G06T 1/20
345/634
2006/0244820 A1\*  11/2006   Morita .................. G06T 19/006
348/14.13

(Continued)

FOREIGN PATENT DOCUMENTS

CN   102474663 A    5/2012
EP    2464129 A1    6/2012
(Continued)

OTHER PUBLICATIONS

International Search Report and Written Opinion of PCT Application No. PCT/JP2017/031858, dated Nov. 21, 2017, 09 pages of ISRWO.

*Primary Examiner* — Jeffery A Brier
(74) *Attorney, Agent, or Firm* — Chip Law Group

(57) ABSTRACT

In an apparatus that synthesizes a plurality of frames, a deviation of display contents is not generated and reduction in a frame rate is suppressed. A first frame generation section generates a first frame whenever a period of a predetermined synchronizing signal has elapsed. A second frame generation section in turn generates a predetermined number of second frames. A synthesis section synthesizes, in a case in which a present frame that is the predetermined second frame is generated by specific timing, the present frame and the first frame and synthesizes, in a case in which the present frame is not generated by the specific timing, as a past frame, the second frame prior to the present frame with the first frame.

10 Claims, 25 Drawing Sheets

(51) Int. Cl.
*G09G 5/399* (2006.01)
*G09G 5/00* (2006.01)

(52) U.S. Cl.
CPC ..... *G09G 2340/12* (2013.01); *G09G 2360/18* (2013.01)

(56) References Cited

U.S. PATENT DOCUMENTS

| | | | |
|---|---|---|---|
| 2007/0057969 A1* | 3/2007 | McCrossan | G09G 5/363 345/629 |
| 2010/0002014 A1 | 1/2010 | Sakamoto et al. | |
| 2012/0128327 A1 | 5/2012 | Matsubara | |
| 2014/0111546 A1* | 4/2014 | Utagawa | G02B 27/017 345/633 |
| 2014/0129207 A1* | 5/2014 | Bailey | G06F 40/58 704/2 |
| 2015/0379772 A1* | 12/2015 | Hoffman | G06T 19/006 345/633 |

FOREIGN PATENT DOCUMENTS

| | | |
|---|---|---|
| JP | 03-145394 A | 6/1991 |
| JP | 3-145394 A | 6/1991 |
| JP | 2004-222876 A | 8/2004 |
| JP | 2007-214659 A | 8/2007 |
| JP | 2010-020186 A | 1/2010 |
| JP | 2010-20186 A | 1/2010 |
| JP | 2014-238507 A | 12/2014 |
| WO | 2011/016240 A1 | 2/2011 |

* cited by examiner

FIG.17

| FRAME BUFFER IDENTIFICATION INFORMATION | NEXT SYNTHESIZED PLANE INFORMATION | PRESENT SYNTHESIZED PLANE INFORMATION | NON-UPDATE COUNTER VALUE |
|---|---|---|---|
| 01 | NF1:B PLANE<br>NA1:C(HORIZONTAL)<br>× D(LONGITUDINAL) | PF1:A PLANE<br>PA1:C(HORIZONTAL)<br>× D(LONGITUDINAL) | C1:0 |
| 02 | NF2:B PLANE<br>NA2:E(HORIZONTAL)<br>× F(LONGITUDINAL) | PF2:A PLANE<br>PA2:C(HORIZONTAL)<br>× D(LONGITUDINAL) | C2:2 |
| 03 | NF3:A PLANE<br>NA3:C(HORIZONTAL)<br>× D(LONGITUDINAL) | PF3:A PLANE<br>PA3:C(HORIZONTAL)<br>× D(LONGITUDINAL) | C3:0 |

FRAME BUFFER MANAGEMENT INFORMATION — 600

DISPLAY CONTROL APPARATUS, ELECTRONIC EQUIPMENT, AND CONTROL METHOD OF DISPLAY CONTROL APPARATUS

CROSS REFERENCE TO RELATED APPLICATIONS

This application is a U.S. National Phase of International Patent Application No. PCT/JP2017/031858 filed on Sep. 5, 2017, which claims priority benefit of Japanese Patent Application No. JP 2016-208414 filed in the Japan Patent Office on Oct. 25, 2016. Each of the above-referenced applications is hereby incorporated herein by reference in its entirety.

TECHNICAL FIELD

The present technology relates to a display control apparatus, electronic equipment, a control method of a display control apparatus, and a program for causing a computer to execute the method. Specifically, the present technology relates to a display control apparatus that synthesizes a plurality of frames, electronic equipment, a control method of a display control apparatus, and a program for causing a computer to execute the method.

BACKGROUND ART

In recent years, a research or development of an AR (Augmented Reality) technique in which CG (Computer Graphics) is synthesized with an imaged frame in real time to thereby augment a reality environment is advanced. There is proposed a system in which a display controller used in the AR technique synthesizes a plurality of frames to be synthesized (for example, refer to PTL 1). Synthesis processing of the display controller is started when all of the frames to be synthesized are generated. Afterwards, the synthesis frame is displayed in synchronization with a vertical synchronizing signal.

CITATION LIST

Patent Literature

[PTL 1]
JP 2014-238507A

SUMMARY

Technical Problems

However, in the above-mentioned related technique, when generation of any frame to be synthesized is delayed, a deviation is generated in a combination of the frames to be synthesized and a deviation is generated in display contents of the synthesis frame. In order to eliminate the deviation in the display contents, a frame rate must be reduced. As described above, in the above-mentioned related technique, there arises a problem that it is difficult to suppress reduction in the frame rate instead of generating the deviation in the display contents.

The present technology was made in light of the foregoing, and it is an object of the present technology to suppress reduction in a frame rate instead of generating a deviation in display contents in an apparatus that synthesizes a plurality of frames.

Solution to Problems

The present technology has been made to eliminate the above-mentioned disadvantages and a first aspect thereof is a display control apparatus, a control method thereof, and a program for causing a computer to execute the control method, including a first frame generation section configured to generate a first frame whenever a period of a predetermined synchronizing signal has elapsed; a second frame generation section configured to in turn generate a predetermined number of second frames; and a synthesis section configured to synthesize, in a case in which a present frame that is the predetermined second frame is generated by specific timing, the present frame and the first frame and synthesize, in a case in which the present frame is not generated by the specific timing, as a past frame, the second frame before the present frame with the first frame. This configuration has effectiveness in that in a case in which the present frame is not generated by the specific timing, the past frame and the first frame are synthesized.

In addition, in this first aspect, the first frame may be an imaged frame imaged by a solid-state image sensing device. This configuration has effectiveness in that the imaged frame is synthesized.

In addition, in this first aspect, the second frame may be a display frame that displays predetermined information. This configuration has effectiveness in that the display frame is synthesized.

In addition, in this first aspect, in a case in which the present frame is generated by the specific timing, the synthesis section may start processing for synthesizing the present frame and the first frame when the specific timing has elapsed. This configuration has effectiveness in that when the specific timing has elapsed, the synthesis processing is started.

In addition, in this first aspect, in a case in which the present frame is generated by the specific timing, the synthesis section may start the processing for synthesizing the present frame and the first frame when the present frame and the first frame are generated. This configuration has effectiveness in that when the present frame is generated, the synthesis processing is started.

In addition, in this first aspect, the synthesis section may further synthesize a third frame with a synthesis frame in which the first frame and the second frame are synthesized. This configuration has effectiveness in that the third frame is further synthesized.

The display control apparatus described in claim 1.

In addition, in this first aspect, the third frame may be a detection frame generated from a result in which a predetermined object is detected in the imaged frame. This configuration has effectiveness in that the detection frame is synthesized.

In addition, in this first aspect, the display control apparatus further includes: a first frame buffer configured to retain the first frame; a second frame buffer configured to retain the second frame; a third frame buffer configured to retain the third frame; and a management section configured to measure each frequency of updating of the first, second, and third frame buffers. The synthesis section may change a synthesis condition on a basis of the measured frequency of updating. This configuration has effectiveness in that the frequency of updating is adjusted.

In addition, in this first aspect, the synthesis section may acquire the past frame from the second frame buffer. This configuration has effectiveness in that the past frame acquired from the frame buffer is synthesized.

In addition, a second aspect of the present technology is electronic equipment including: a first frame generation section configured to generate a first frame whenever a period of a predetermined synchronizing signal has elapsed; a second frame generation section configured to in turn generate a predetermined number of second frames; and a synthesis section configured to synthesize, in a case in which a present frame that is the predetermined second frame is generated by specific timing, the present frame and the first frame and synthesize, in a case in which the present frame is not generated by the specific timing, as a past frame, the second frame before the present frame with the first frame. This configuration has effectiveness in that in a case in which the present frame is not generated by the specific timing, the past frame and a detection information frame are synthesized.

Advantageous Effect of Invention

According to the present technology, it is possible to exert an excellent effect of being capable of suppressing reduction in a frame rate instead of generating a deviation of display contents. It should be noted that the effect described here is not necessarily limitative and may be any effect described in the present disclosure.

BRIEF DESCRIPTION OF DRAWINGS

FIG. 17 is a diagram illustrating an example of a data structure of frame buffer management information according to the third embodiment of the present technology.

DESCRIPTION OF EMBODIMENTS

Hereinafter, modes (hereinafter, referred to as embodiments) for carrying out the present technology will be described. Descriptions will be made in the following order.

1. First embodiment (an example in which a synthesis is started at specific timing)
2. Second embodiment (an example in which a synthesis is started by specific timing)
3. Third embodiment (an example in which a frame rate is adjusted and a synthesis is started at specific timing)

1. First Embodiment

[Configuration Example of AR Terminal]

Figure 1:
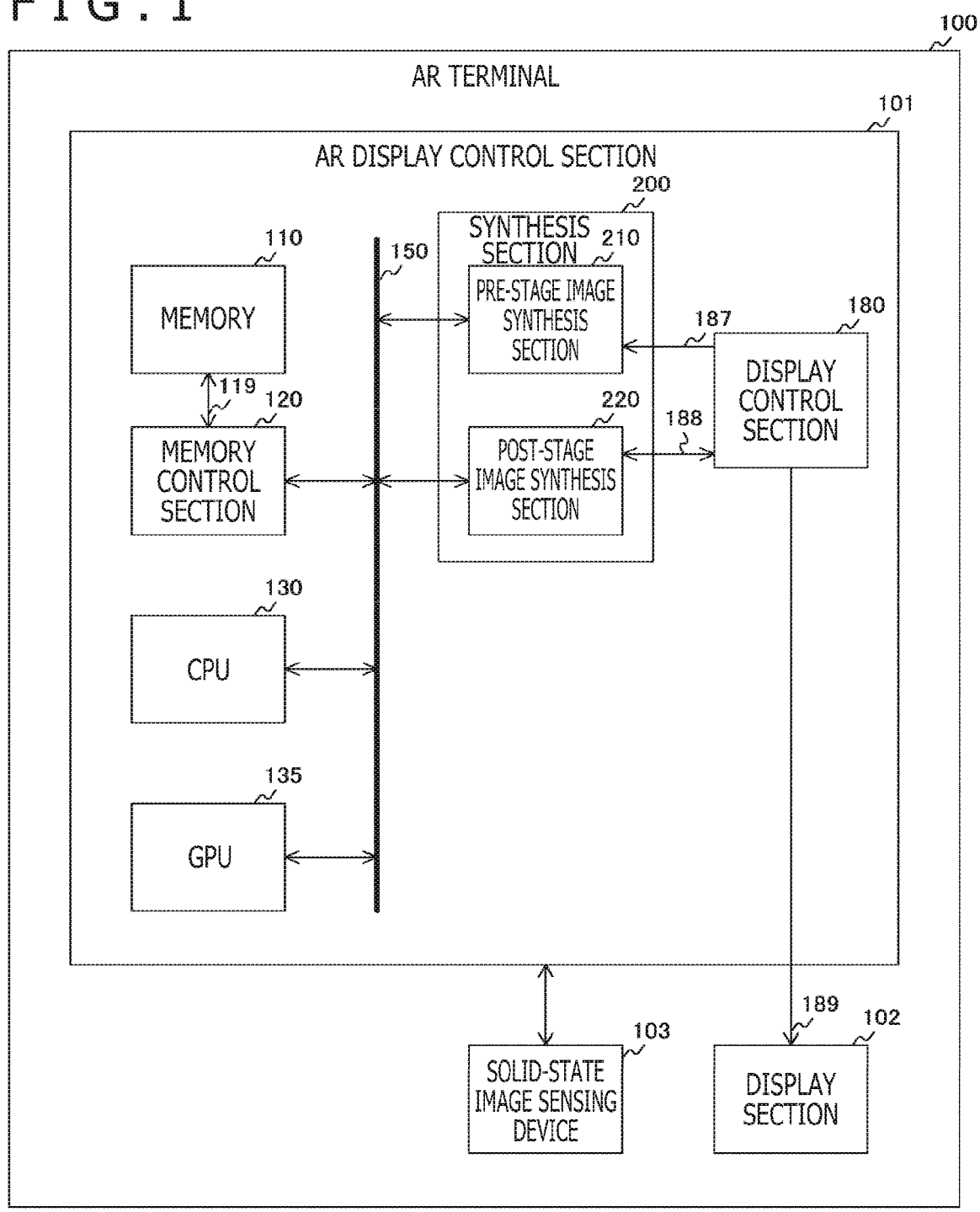
FIG. 1 is a block diagram illustrating one configuration example of an AR terminal according to a first embodiment of the present technology.

FIG. 1 is a block diagram illustrating a configuration example of an AR terminal 100 according to a first embodiment of the present technology. The AR terminal 100 synthesizes a plurality of frames into one frame and displays the frame. Further, the AR terminal 100 includes an AR display control section 101, a display section 102, and a solid-state image sensing device 103. Further, a shape of the AR terminal 100 is a goggle type, for example, and a user can wear the AR terminal 100 on the head and appreciate frames displayed on the display section 102. The AR display control section 101 includes a memory 110, a memory control section 120, a CPU (Central Processing Unit) 130, a GPU (Graphics Processing Unit) 135, a bus 150, a synthesis section 200, and a display control section 180. Note that the AR display control section 101 is an example of a display control apparatus described in scope of claims and the AR terminal 100 is an example of electronic equipment described in scope of claims.

The memory 110 retains data used by the CPU 130 and frames generated by the solid-state image sensing device 103 or the GPU 135. The memory control section 120 accesses the memory 110 via a memory bus 119 and performs writing or reading of data.

The CPU 130 controls the entire AR display control section 101. The GPU 135 draws (generates) a frame in accordance with control of drawing software executed by the CPU 130. By using the GPU 135, a detection frame and a display frame are generated.

Here, the detection frame is a frame generated from a result in which a predetermined object (person etc.) in an imaged frame imaged by the solid-state image sensing device 103 is detected. In the detection frame, for example, CG that indicates a detection frame, an item in a game, or the like is arranged in a position of the detected object. Further, the display frame is a frame that displays multiple pieces of information and is generated without using the imaged frame. For example, a frame indicative of a status of the present time, a remaining battery level, etc., various messages, or the like is generated as the display frame. The detection frame and display frame are generated in synchronization with a vertical synchronizing signal VSYNC and are, for example, retained in the memory 110. Note that the GPU 135 generates the display frame without using the imaged frame. Further, the GPU 135 may generate the display frame by processing the imaged frame.

The vertical synchronizing signal VSYNC is a periodic signal of a fixed frequency (60 hertz etc.) indicative of a display of frames or timing of imaging. Further, the vertical synchronizing signal VSYNC is generated by a phase synchronization circuit, frequency divider, or the like in the AR terminal 100. A circuit that generates the vertical synchronizing signal VSYNC is omitted in FIG. 1.

The bus 150 is a common route for sending and receiving data to and from each other by the memory control section 120, the CPU 130, the GPU 135, the synthesis section 200, and the solid-state image sensing device 103.

The synthesis section 200 synthesizes a plurality of frames. The synthesis section 200 includes a pre-stage image synthesis section 210 and a post-stage image synthesis section 220. In accordance with control of the display control section 180, the pre-stage image synthesis section 210 synthesizes the imaged frame imaged by the solid-state image sensing device 103 and the display frame generated by the GPU 135 and generates the synthesis frame. The synthesis frame is, for example, retained in the memory 110. Further, the synthesis section 200 can be allowed to operate by a clock signal independent from a clock signal to other circuits. Further, the synthesis section 200 can allow the respective pre-stage image synthesis section 210 and post-stage image synthesis section 220 to operate by different clock signals.

In accordance with control of the display control section 180, the post-stage image synthesis section 220 synthesizes the synthesis frame generated by the pre-stage image synthesis section 210 and the detection frame generated by the GPU 135. The post-stage image synthesis section 220 provides, as an output frame, the synthesized frame for the display control section 180.

The solid-state image sensing device 103 images the imaged frame in synchronization with the vertical synchronizing signal VSYNC. The imaged frame is, for example, retained in the memory 110. Note that the solid-state image sensing device 103 is an example of a first frame generation section described in scope of claims.

The display control section 180 controls the synthesis section 200 to perform synthesis processing. The display control section 180 receives the output frame from the synthesis section 200 and outputs the output frame to the display section 102 via a signal line 189.

The display section 102 displays the output frame. For example, a non-transmissive type display such as a liquid crystal display or an organic EL (Electro Luminescence) display or a transmissive type display such as a projection type display is used as the display section 102. As described above, the CG is synthesized with the output frame in real time. Therefore, the display of the output frame can allow the user to feel as if the CG is really present. The process permits a reality environment to be augmented.

Note that the AR display control section 101, the display section 102, and the solid-state image sensing device 103 are installed in the AR terminal 100. Further, when the AR display control section 101, the display section 102, and the solid-state image sensing device 103 each are an apparatus or equipment that synthesizes a plurality of frames, they may be installed in an apparatus or equipment (e.g., a smartphone or a personal computer) other than the AR terminal 100. Further, the AR display control section 101, the display section 102, and the solid-state image sensing device 103 are installed in one instrument, and further may be arranged in a plurality of instruments in a distributed manner. For example, the AR display control section 101 may be installed in a personal computer or the like, the display section 102 may be installed in a display apparatus such as a liquid crystal display, and the solid-state image sensing device 103 may be installed in a camera module. Similarly, even each section within the AR display control section 101 may be arranged in a plurality of instruments in a distributed manner.

[Configuration Example of Pre-Stage Image Synthesis Section]

Figure 2:
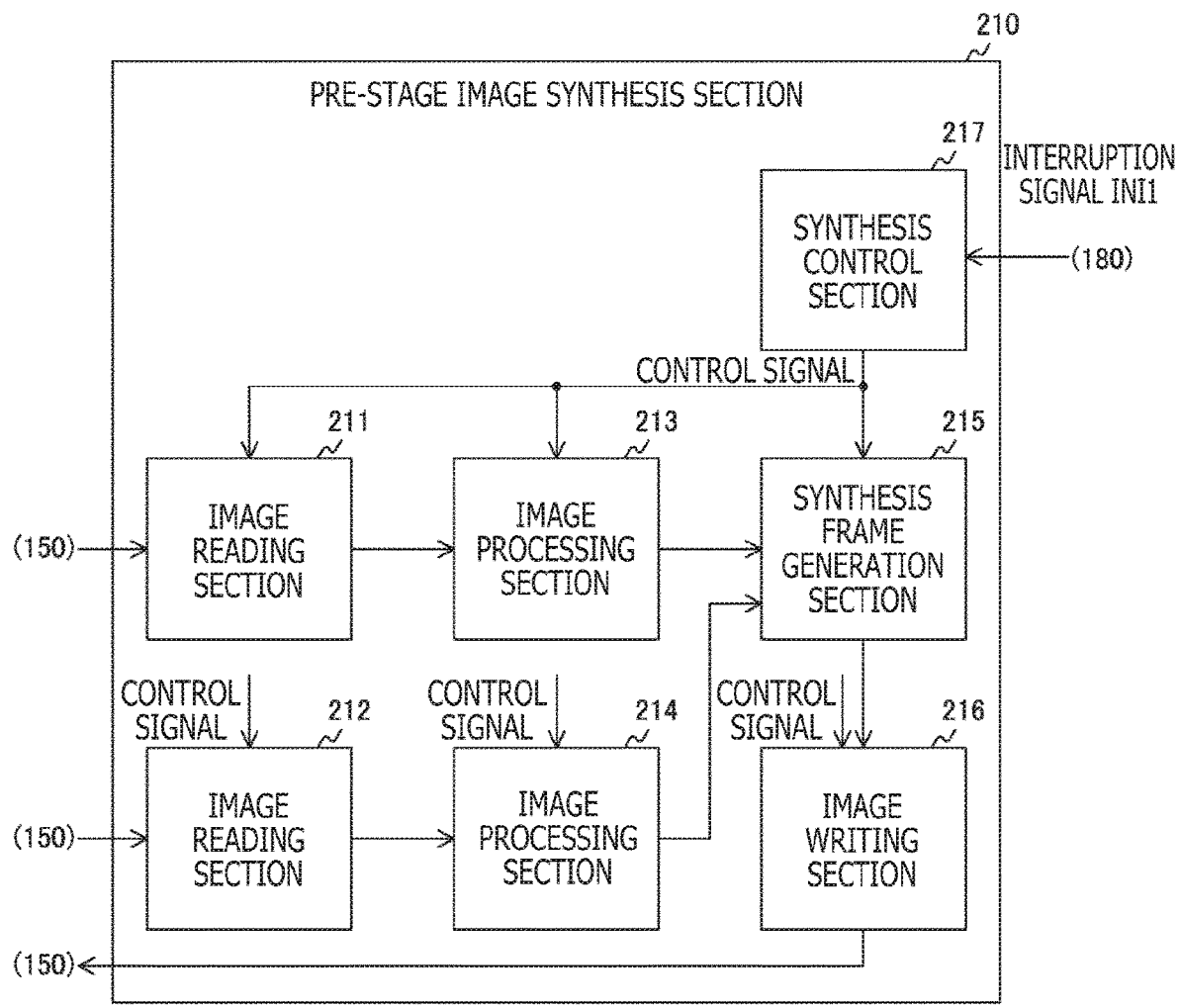
FIG. 2 is a block diagram illustrating one configuration example of a pre-stage image synthesis section according to the first embodiment of the present technology.

FIG. 2 is a block diagram illustrating a configuration example of the pre-stage image synthesis section 210 according to the first embodiment of the present technology. The pre-stage image synthesis section 210 includes image reading sections 211 and 212, image processing sections 213 and 214, a synthesis frame generation section 215, an image writing section 216, and a synthesis control section 217.

An image reading section 211 reads the imaged frame imaged by the solid-state image sensing device 103 from the memory 110 via the memory control section 120 and the bus 150. The image reading section 211 provides the read frame for the image processing section 213.

The image reading section 212 reads the display frame drawn by the GPU 135 from the memory 110 via the memory control section 120 and the bus 150. The image reading section 212 provides the read frame for the image processing section 214.

The image processing section 213 performs predetermined image processing on the imaged frame. As the image processing, for example, an adjustment of resolution or color information, a change in an image format, and the like are performed if necessary. The image processing section 213 provides the imaged frame after the image processing for the synthesis frame generation section 215.

The image processing section 214 performs the predetermined image processing on the display frame. The image processing section 214 provides the display frame after the image processing for the synthesis frame generation section 215.

The synthesis frame generation section 215 synthesizes a plurality of frames in accordance with control of the synthesis control section 217.

The synthesis control section 217 controls the entire pre-stage synthesis section 210. Functions of the synthesis control section 217 are achieved by the CPU or various circuits, for example. An interruption signal INI1 for starting a synthesis of the pre-stage is input to the synthesis control section 217 by the display control section 180. The interruption signal INI1 indicates, as timing at which the synthesis ought to be started, a specific timing in a period of the vertical synchronizing signal VSYNC. By timing indicated by the interruption signal INI1, the synthesis control section 217 determines whether or not the display frame is generated. If the display frame is generated, the synthesis control section 217 controls the synthesis frame generation section 215 to start the synthesis of the updated display frame and the imaged frame.

On the other hand, if the display frame is not generated by the timing indicated by the interruption signal INI1, the synthesis control section 217 controls the image reading section 212 to acquire, from the memory 110, a previous past display frame of the present display frame on the way to the generation. Then, the synthesis control section 217 controls the synthesis frame generation section 215 to start the synthesis of the past display frame and the present imaged frame. The synthesis frame generation section 215 provides the generated synthesis frame for the image writing section 216.

The image writing section 216 writes the synthesis frame in the memory 110 via the memory control section 120 and the bus 150.

[Configuration Example of Post-Stage Image Synthesis Section]

Figure 3:
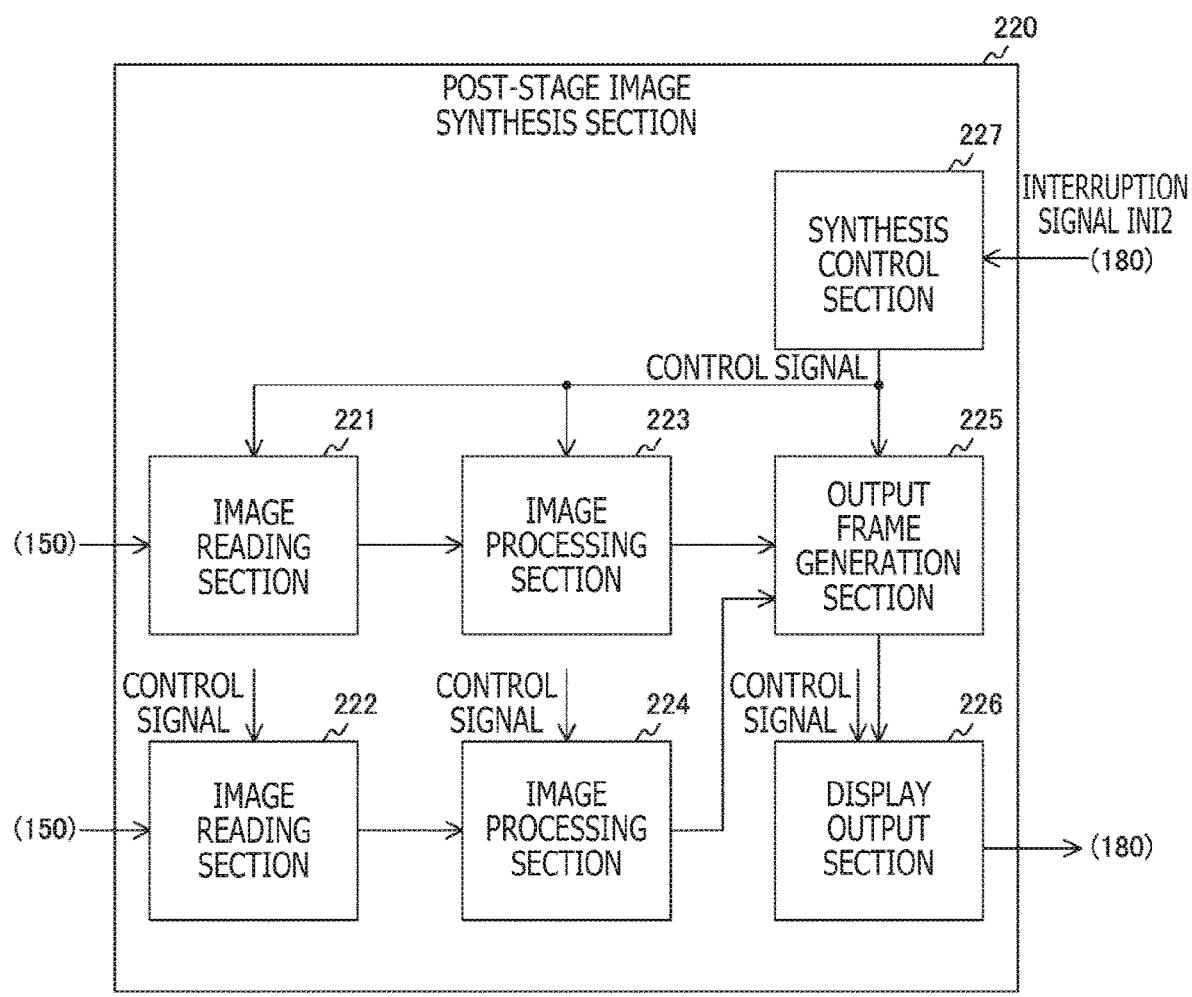
FIG. 3 is a block diagram illustrating one configuration example of a post-stage image synthesis section according to the first embodiment of the present technology.

FIG. 3 is a block diagram illustrating a configuration example of the post-stage image synthesis section 220 according to the first embodiment of the present technology. The post-stage image synthesis section 220 includes image reading sections 221 and 222, image processing sections 223 and 224, an output frame generation section 225, a display output section 226, and a synthesis control section 227.

The image reading section 221 reads the synthesis frame generated by the pre-stage image synthesis section 210 from the memory 110 via the memory control section 120 and the bus 150. The image reading section 221 provides the read synthesis frame for the image processing section 223.

The image reading section 222 reads the detection frame drawn by the GPU 135 from the memory 110 via the memory control section 120 and the bus 150. The image reading section 222 provides the read detection frame for the image processing section 224.

The image processing section 223 performs the predetermined image processing on the synthesis frame. The image processing section 223 provides the synthesis frame after the image processing for the output frame generation section 225. The image processing section 224 performs the predetermined image processing on the detection frame. The image processing section 224 provides the detection frame after the image processing for the output frame generation section 225.

The output frame generation section 225 synthesizes the detection frame and the synthesis frame and outputs it as the output frame in accordance with control of the synthesis control section 227.

The synthesis control section 227 controls the entire post-stage synthesis section 220. Functions of the synthesis control section 227 are achieved by the CPU or various circuits, for example. An interruption signal INI2 for starting a synthesis of the post-stage is input to the synthesis control section 227 by the display control section 180. The interruption signal INI2 indicates, as the timing at which the synthesis ought to be started, specific timing different from timing corresponding to the interruption signal INI1 in the period of the vertical synchronizing signal VSYNC. When timing of the interruption signal INI2 has elapsed, the synthesis control section 227 controls the output frame generation section 225 to start the synthesis of the detection frame and the synthesis frame. Then, the output frame generation section 225 provides the generated output frame for the display output section 226. The display output section 226 outputs the output frame to the display control section 180.

Figure 4:
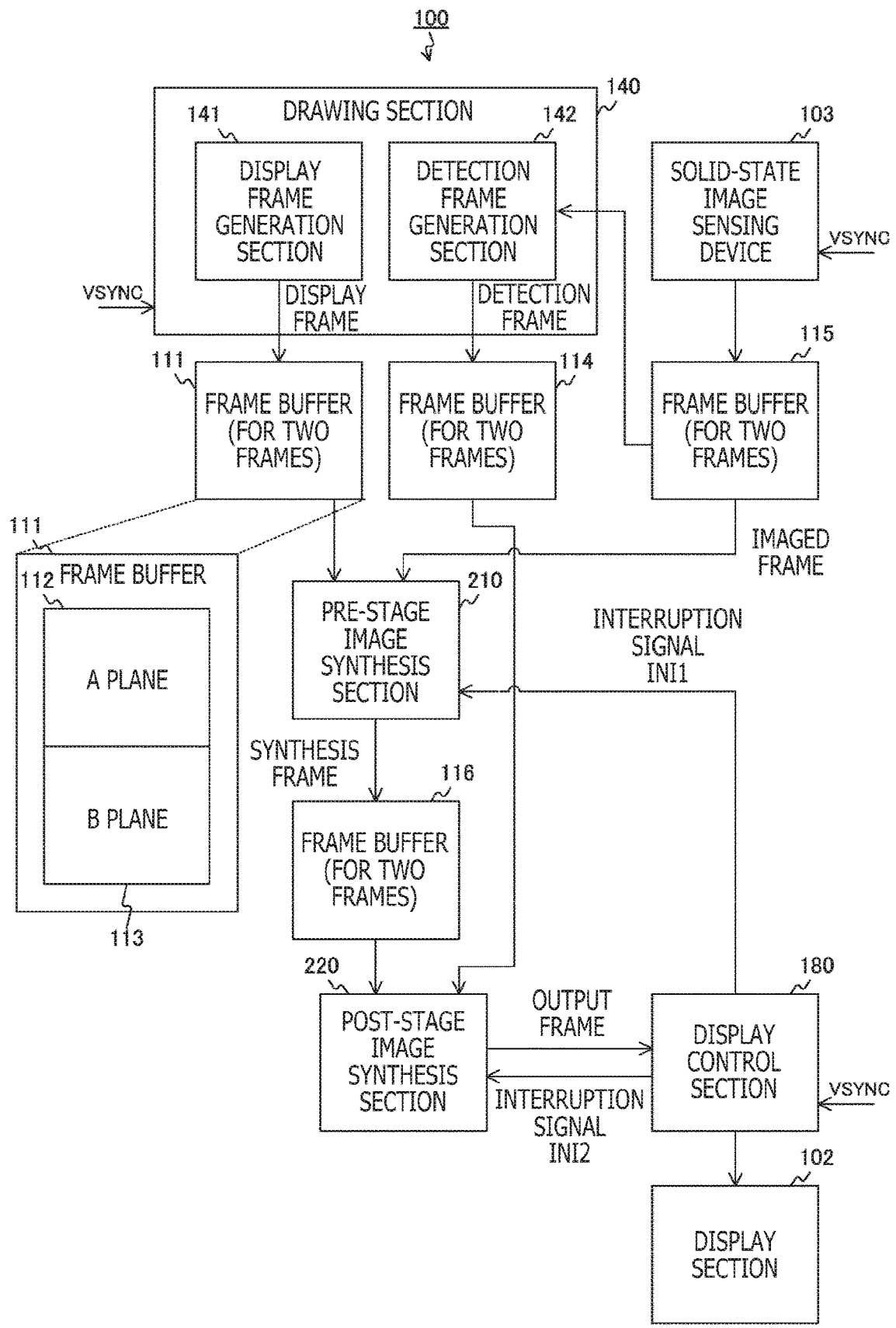
FIG. 4 is a block diagram illustrating a functional configuration example of the AR terminal according to the first embodiment of the present technology.

FIG. 4 is a block diagram illustrating a functional configuration example of the AR terminal 100 according to the first embodiment of the present technology. The AR terminal 100 includes a drawing section 140, frame buffers 111, 114, 115, and 116, the pre-stage image synthesis section 210, the post-stage image synthesis section 220, the display control section 180, the display section 102, and the solid-state image sensing device 103.

The drawing section 140 illustrated in FIG. 4 is, for example, achieved by the GPU 135 and the drawing software executed by the CPU 130 illustrated in FIG. 1. Further, the frame buffers 111, 114, 115, and 116 illustrated in FIG. 4 are, for example, installed in the memory 110 illustrated in FIG. 1.

The drawing section 140 includes a display frame generation section 141 and a detection frame generation section 142. The display frame generation section 141 generates a plurality of display frames in chronological order without using the imaged frame in synchronization with the vertical synchronizing signal VSYNC. The display frame generation section 141 writes the generated display frame in the frame buffer 111. Note that the display frame generation section 141 is an example of a second frame generation section described in scope of claims.

The frame buffer 111 retains the display frame for two frames. An A plane 112 and a B plane 113 are formed in the frame buffer 111 and each plane can retain one frame. The display frame generation section 141 first writes a zero-th display frame, for example, in the A plane 112 and secondly writes a first display frame in the B plane 113. The next second display frame is written in the A plane 112. Subsequently, whenever the display frame is generated, a plane of the write destination is similarly switched. Further, when writing is completed, a CPU in the drawing section 140 notifies the synthesis section 200 of the plane in which the writing is completed in the A plane 112 and the B plane 113. The notification permits the synthesis section 200 to acquire timing at which drawing is completed. Hereinafter, in two frames retained in the frame buffer 111, a new frame is referred to as a frame of the "present" and the other frame is referred to as a frame of the "past." Even in the frame buffers 114, 115, and 116, two frames are similarly retained.

Note that the frame buffers 111, 114, 115, and 116 retain two frames; however, the number of the retained frames is not limited to two frames. The frame buffers may retain, for example, one frame or three frames or more.

The detection frame generation section 142 generates the detection frame from a result of detecting a predetermined object in the imaged frame. The detection frame generation section 142 reads the imaged frame from the frame buffer 115 and detects the predetermined object (person etc.) in the imaged frame. Then, in synchronization with the vertical synchronizing signal VSYNC, the detection frame generation section 142 generates the detection frame indicative of CG such as a detection frame in a position in which a person etc. are detected. Further, the detection frame generation section 142 writes the detection frame in the frame buffer 114. Note that the detection frame generation section 142 is an example of a third frame generation section described in scope of claims.

In synchronization with the vertical synchronizing signal VSYNC, the solid-state image sensing device 103 images the imaged frame and writes the imaged frame in the frame buffer 115. Note that the solid-state image sensing device 103 is an example of the first frame generation section described in scope of claims.

In a case in which drawing (generation) of the display frame is completed by timing of the interruption signal INI1, the pre-stage image synthesis section 210 reads the present display frame and imaged frame and synthesizes them.

On the other hand, if the display frame is not generated by the timing, the pre-stage image synthesis section 210 reads the past display frame and synthesizes the past display frame with the present imaged frame. Then, the pre-stage image synthesis section 210 writes the synthesis frame in the frame buffer 116.

At timing indicated by the interruption signal INI2, the post-stage image synthesis section 220 reads the synthesis frame and the detection frame from the frame buffers 114 and 116 and starts the synthesis of them. In synchronization with the vertical synchronizing signal VSYNC, the display control section 180 generates the interruption signals INI1 and INI2 and provides them for the pre-stage image synthesis section 210 and the post-stage image synthesis section 220.

Figure 5:
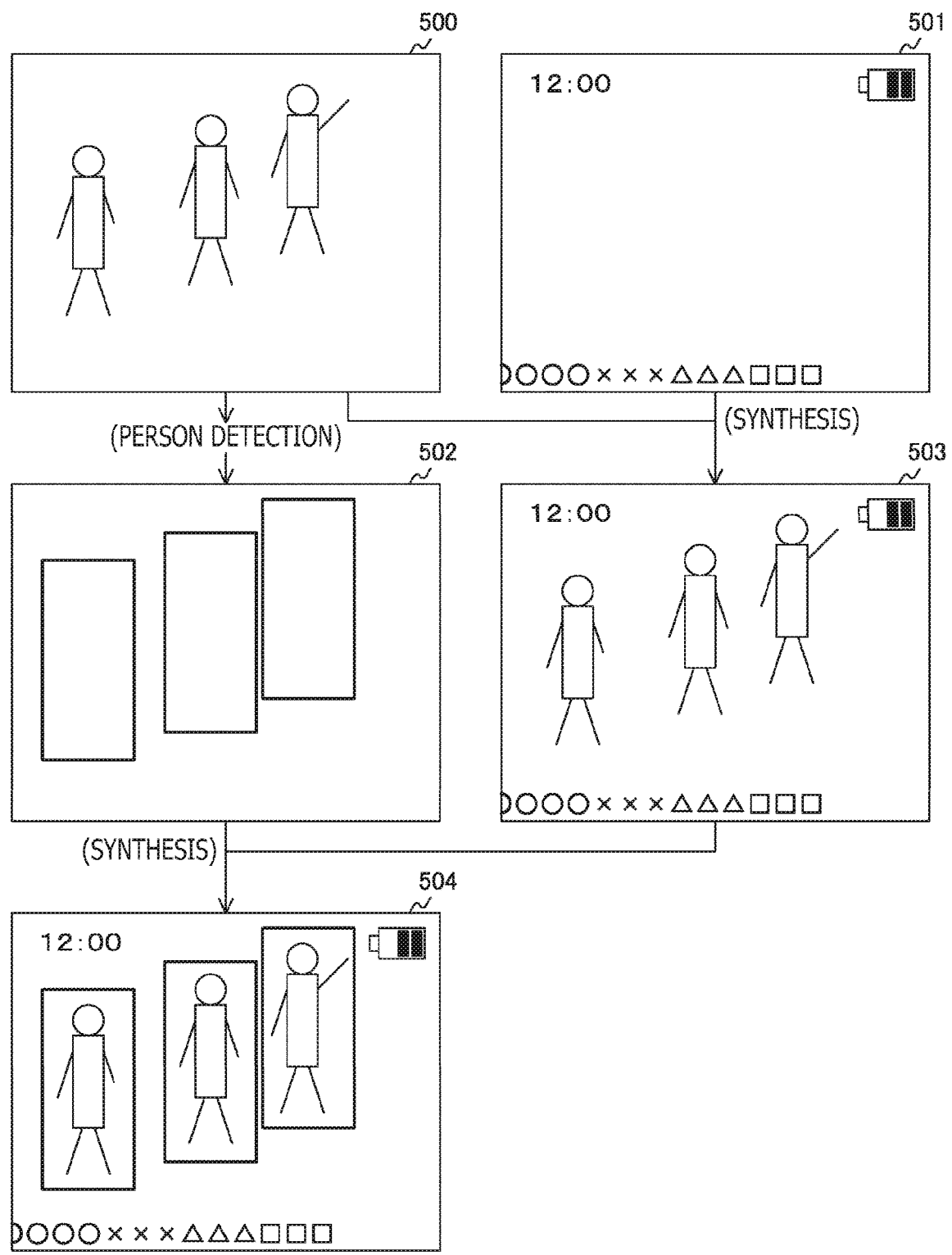
FIG. 5 is a diagram illustrating an example of frames before and after the synthesis according to the first embodiment of the present technology.

FIG. 5 is a diagram illustrating an example of frames before and after the synthesis according to the first embodiment of the present technology. The solid-state image sensing device 103 images the imaged frame 500 in which three persons are projected in synchronization with the vertical synchronizing signal VSYNC. The detection frame generation section 142 detects persons within the imaged frame 500. Further, the detection frame generation section 142 generates a detection frame 502 in which detection frames are arranged in the detected positions in synchronization with the vertical synchronizing signal VSYNC.

Further, the display frame generation section 141 generates a display frame 501 indicative of the present time, remaining battery level, and messages in synchronization with the vertical synchronizing signal VSYNC. The message is, for example, scroll-displayed in the vicinity of a lower end of the display frame. Note that the display frame generation section 141 displays the present time, remaining battery level, and messages; however, information to be displayed is not limited thereto. In addition, the display frame generation section 141 need not display all of the present time, remaining battery level, and messages and may display one piece or two pieces of them. Further, the message may be fixedly displayed instead of being scroll-displayed.

Then, the synthesis control section 217 controls the pre-stage image synthesis section 210 to start the synthesis of the display frame 501 and the imaged frame 500 at the timing indicated by the interruption signal INI1. If generation of the updated display frame 501 is not completed by the timing, the synthesis control section 217 allows the pre-stage image synthesis section 210 to read the previous past display frame from the frame buffer 111 and to synthesize the display frame with the imaged frame 500. The synthesis permits the synthesis frame 503 to be generated.

Subsequently, the synthesis control section 227 controls the post-stage image synthesis section 220 to synthesize the synthesis frame 503 and the detection frame 502 at the timing indicated by the interruption signal INI2 and to output it as an output frame 504.

As exemplified in FIG. 5, in a case in which messages are scroll-displayed, a large number of messages are displayed, or the like, a throughput of the GPU 135 may be increased and a drawing completion of the display frame 501 may be delayed due to the above influence. In this case, there is a possibility that when the synthesis is started after drawing of the display frame 501 is completed, the synthesis is not completed in the period of the vertical synchronizing signal VSYNC. In addition, there is a possibility that a deviation is generated between the detection frame 502 and the imaged frame 500 in the output frame 504.

To solve the above problem, the pre-stage image synthesis section 210 starts the synthesis at the timing indicated by the interruption signal INI1. Therefore, timing at which the synthesis is in time is set to the interruption signal INI1, and thereby the pre-stage image synthesis section 210 can complete the synthesis in the period of the vertical synchronizing signal VSYNC. Accordingly, in the output frame 504, a phenomenon in which a deviation is generated between the detection frame 502 and the imaged frame 500 can be suppressed.

Here, when generation of the present display frame 501 is not completed by the timing of the interruption signal INI1, the pre-stage image synthesis section 210 reads the previous past display frame 501 and synthesizes the display frame 501 in accordance with control of the synthesis control section 217. On this occasion, the same display frame 501 is continuously displayed across two frames and a frame rate of the display frame 501 is reduced. However, the display frame 501 is not generated from the imaged frame 500 and a degree in relation to the imaged frame 500 is low. Therefore, there is reduced an influence that is exerted on quality of moving images including the output frame 504 owing to reduction in the frame rate of the display frame 501.

On the other hand, the detection frame 502 is generated from the imaged frame 500 and the degree in relation to the imaged frame 500 is high. Therefore, there is a possibility that on the occasion when generation of the detection frame 502 is delayed, when the past detection frame 502 is read and synthesized with the present imaged frame 500, a deviation is generated between the positions of persons and the detection frames to reduce the quality. Accordingly, even if the generation of the detection frame 502 is delayed, for example, the post-stage synthesis section 220 synthesizes the past synthesis frame 503 and the detection frame 502 to be the output frame. Then, the output frame is displayed.

As a specific example, in a case in which generation of M-th (M is an integer) display frame is not completed by the timing of the interruption signal INI1, an (M−1)-th display frame, an M-th detection frame, and an M-th imaged frame are synthesized. On the other hand, if generation of the M-th detection frame is not completed by the timing of the interruption signal INI2, an (M−1)-th imaged frame, detection frame, and display frame are synthesized to be output, for example.

Note that the AR terminal 100 synthesizes a synthesis frame in which the display frame and the imaged frame are synthesized, with the detection frame and further may synthesize only two frames among the above three frames. For example, the AR terminal 100 may synthesize the imaged frame and a display information frame by using the post-stage image synthesis section 220 instead of performing the synthesis by using the pre-stage. Further, in a case in which the display section 102 is a transmissive type display, a deviation between the output frame and the detection frame is expected from a standpoint of a system. Therefore, a motion prediction section that performs a motion prediction is added and a detection frame image in which a deviation in a frame is hard to generate is desirably obtained by using prediction results.

Further, the AR terminal 100 synthesizes two frames (the display frame and the detection frame) with the imaged frame; further, can synthesize three frames or more with the imaged frame. For example, the AR terminal 100 may synthesize two detection frames or more or two display frames or more with the imaged frame. The number of synthesized frames is determined on the basis of contents of executed application. In a case in which the number of the synthesized frames is changed, the pre-stage synthesis section 210 just has to perform the synthesis up to the necessary number of times in time division, for example.

Figure 6:
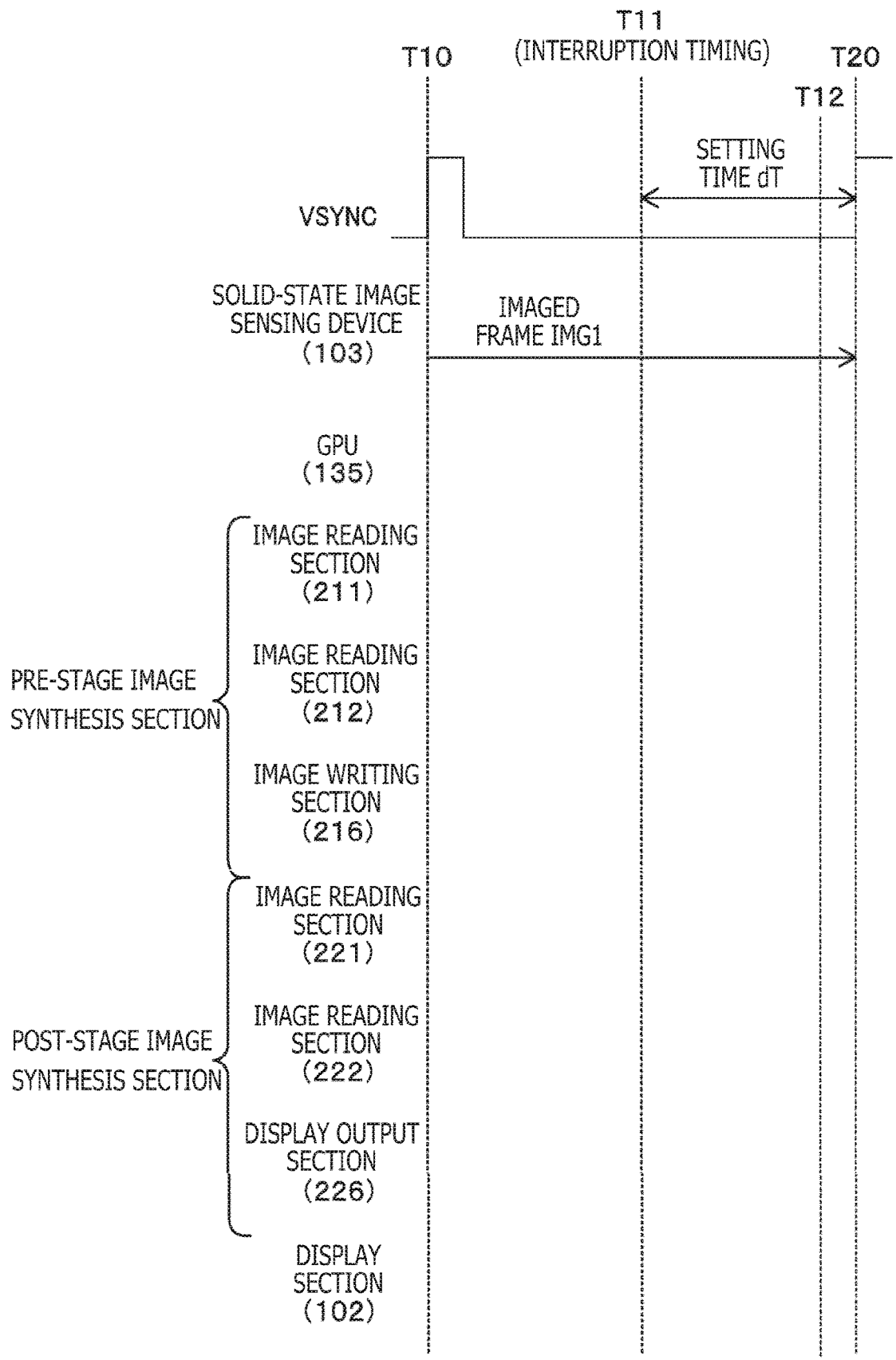
FIG. 6 is a timing chart at the time of imaging a first imaged frame of an AR terminal 100 according to the first embodiment of the present technology.

FIG. 6 is a timing chart at the time of imaging a first imaged frame of the AR terminal 100 according to the first embodiment of the present technology. The vertical synchronizing signal VSYNC rises up at timing T10 or timing T20 in a certain period. Further, it is assumed that the timing of the interruption signal INI2 is immediately before timing at which the vertical synchronizing signal VSYNC rises up.

The display control section 180 outputs the interruption signal INI1 at specific timing T11 before timing at the time of completing (timing T20 etc.) the vertical synchronizing signal VSYNC in the period by predetermined setting time dT. A time obtained by adding a predetermined margin to a time required to synthesize the synthesis frame is set to the setting time dT. The interruption timing can be changed by an operation etc. to input the setting time dT by the user on the basis of the number of frames to be synthesized, a frequency of the vertical synchronizing signal VSYNC, or the like. Note that there may be used a configuration in which a difference between the period of the vertical synchronizing signal VSYNC and the setting time dT is input in place of the setting time dT. Note that the timing of the interruption signal INI2 is uniquely determined and set on the basis of a configuration of the system. The timing is not dynamically changed under normal conditions.

The solid-state image sensing device 103 takes an image at timing in synchronization with the vertical synchronizing signal VSYNC. First imaging of an imaged frame IMG1 is started, for example, at the timing T10.

Figure 7:
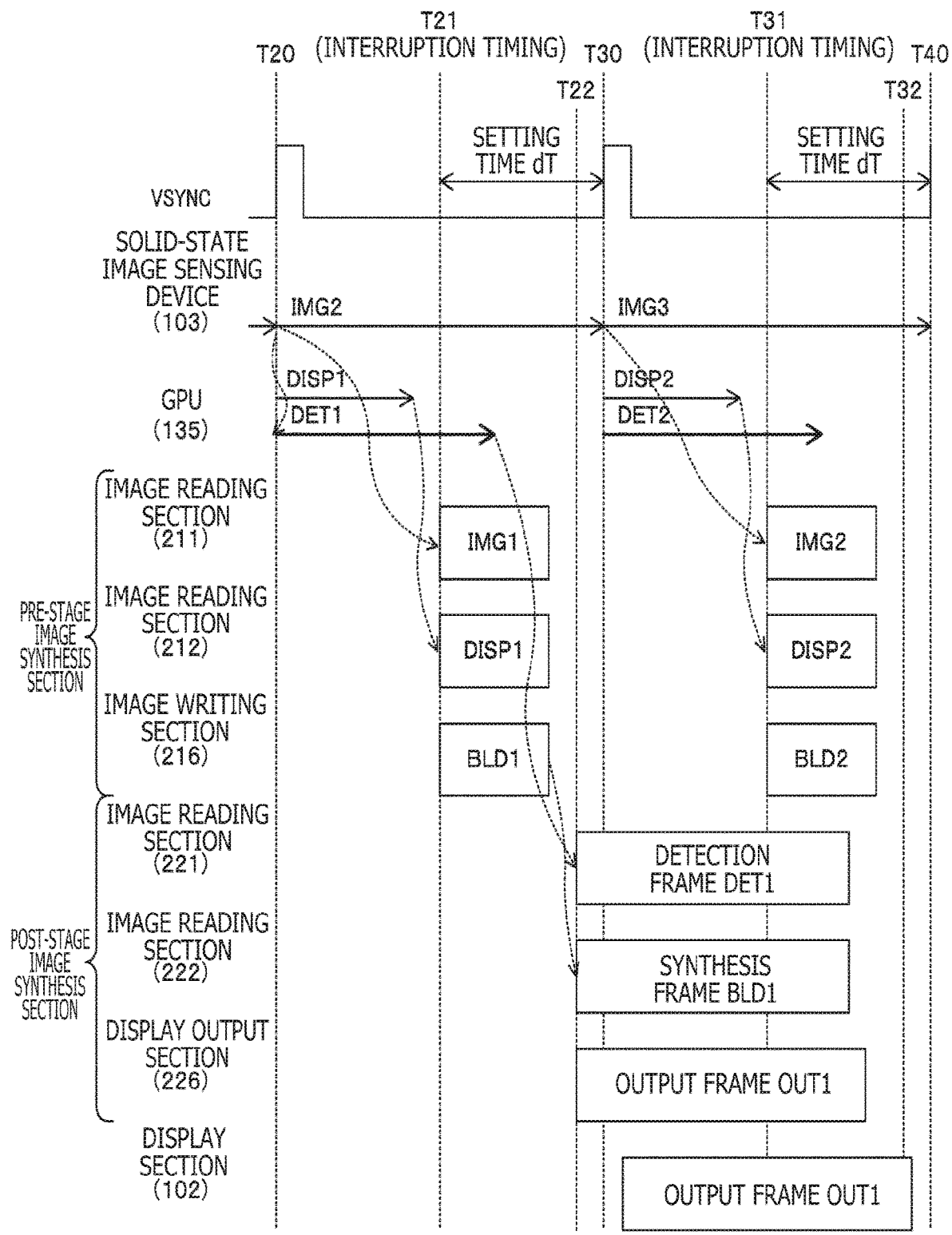
FIG. 7 is a timing chart illustrating an example of synthesis processing of a first output frame of the AR terminal according to the first embodiment of the present technology.

FIG. 7 is a timing chart illustrating an example of the synthesis processing of a first output frame of the AR terminal 100 according to the first embodiment of the present technology.

The GPU 135 starts drawing of a display frame DISP1 and a detection frame DET1 at the timing T20 at which the vertical synchronizing signal VSYNC rises up. Further, the solid-state image sensing device 103 starts imaging a second imaged frame IMG2 at the timing T20.

Here, it is assumed that generation of the display frame DISP1 is completed by timing T21 of the interruption signal INI1. The pre-stage image synthesis section 210 reads the imaged frame IMG1 and the present display frame DISP1 from the frame buffer and starts synthesizing the above frames. Then, generation of a synthesis frame BLD1 is completed before timing T22 of the interruption signal INI2.

By contrast, the post-stage image synthesis section 220 reads the detection frame DET1 and the synthesis frame BLD1 at the timing T22 of the interruption signal INI2 and starts synthesizing an output frame OUT1. The display section 102 completes a display of the output frame OUT1 by timing T40 of the rising of the vertical synchronizing signal VSYNC.

Then, the GPU 135 starts drawing of a display frame DISP2 and a detection frame DET2 at timing T30 at which the vertical synchronizing signal VSYNC rises up. Further, the solid-state image sensing device 103 starts imaging an imaged frame IMG3 at the timing T30.

Note that the AR terminal 100 synthesizes the imaged frame instead of being reduced. Further, the AR terminal 100 may reduce and synthesize the imaged frame. In this case, at the timing (T20 etc.) of the vertical synchronizing signal VSYNC, for example, reduction processing of the imaged frame (IMG1 etc.) that is imaged immediately before is performed by the GPU 135. Then, the reduced image in which the generation is completed by the timing T21 is read by the image reading section 211.

Figure 8:
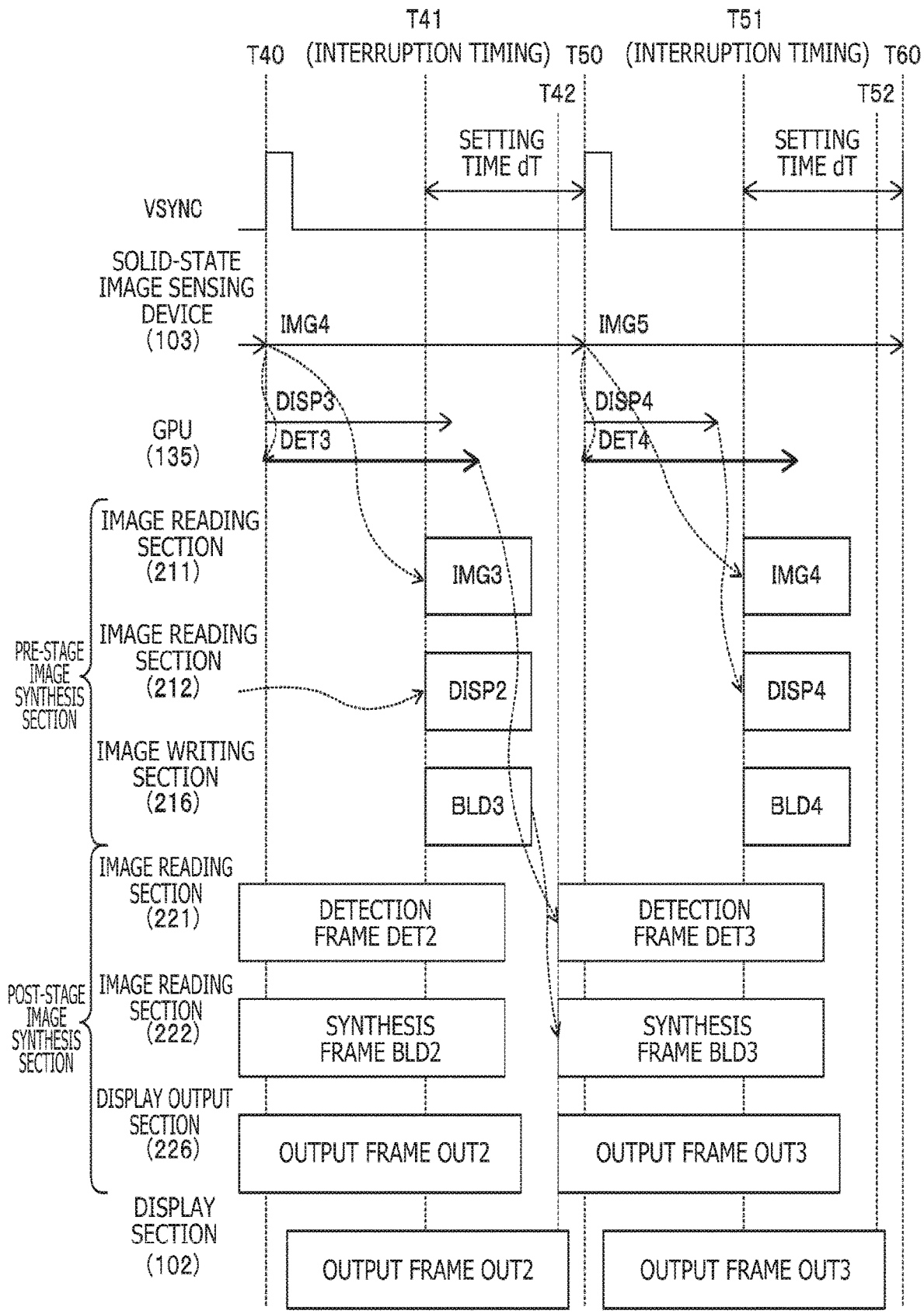
FIG. 8 is a timing chart illustrating an example of the synthesis processing of a second output frame and a third output frame of the AR terminal according to the first embodiment of the present technology.

FIG. 8 is a timing chart illustrating an example of the synthesis processing of a second output frame and a third output frame of the AR terminal 100 according to the first embodiment of the present technology.

The GPU 135 starts drawing a display frame DISP3 and a detection frame DET3 at the timing T40 at which the vertical synchronizing signal VSYNC rises up. Then, the solid-state image sensing device 103 starts imaging an imaged frame IMG4 at the timing T40.

Here, it is assumed that generation of the display frame DISP3 is not completed by timing T41 of the interruption signal INI1. In this case, the pre-stage image synthesis section 210 reads the imaged frame IMG3 and the previous past display frame DISP2 from the frame buffer and starts synthesizing the above frames. Then, generation of a synthesis frame BLD3 is completed before timing T42 of the interruption signal INI2.

Further, at the timing T42 of the interruption signal INI2, the post-stage image synthesis section 220 reads the detection frame DET3 and the synthesis frame BLD3 and starts synthesizing an output frame OUT3. The display section 102 completes a display of the output frame OUT3 by timing T60 of the rising of the vertical synchronizing signal VSYNC.

As exemplified in FIGS. 6, 7, and 8, the display control section 180 allocates a relatively heavy drawing processing necessary for one period of the vertical synchronizing signal VSYNC to the post-stage image synthesis section 220. Further, the display control section 180 allocates a relatively light drawing processing to the pre-stage image synthesis section 210. In addition, the display control section 180 allows the post-stage image synthesis section 220 and the pre-stage image synthesis section 210 to perform the drawing processing in parallel. Thereby, even if the drawing time is estimated to a maximum extent, the processing can be completed in a total of two frames.

Figure 9:
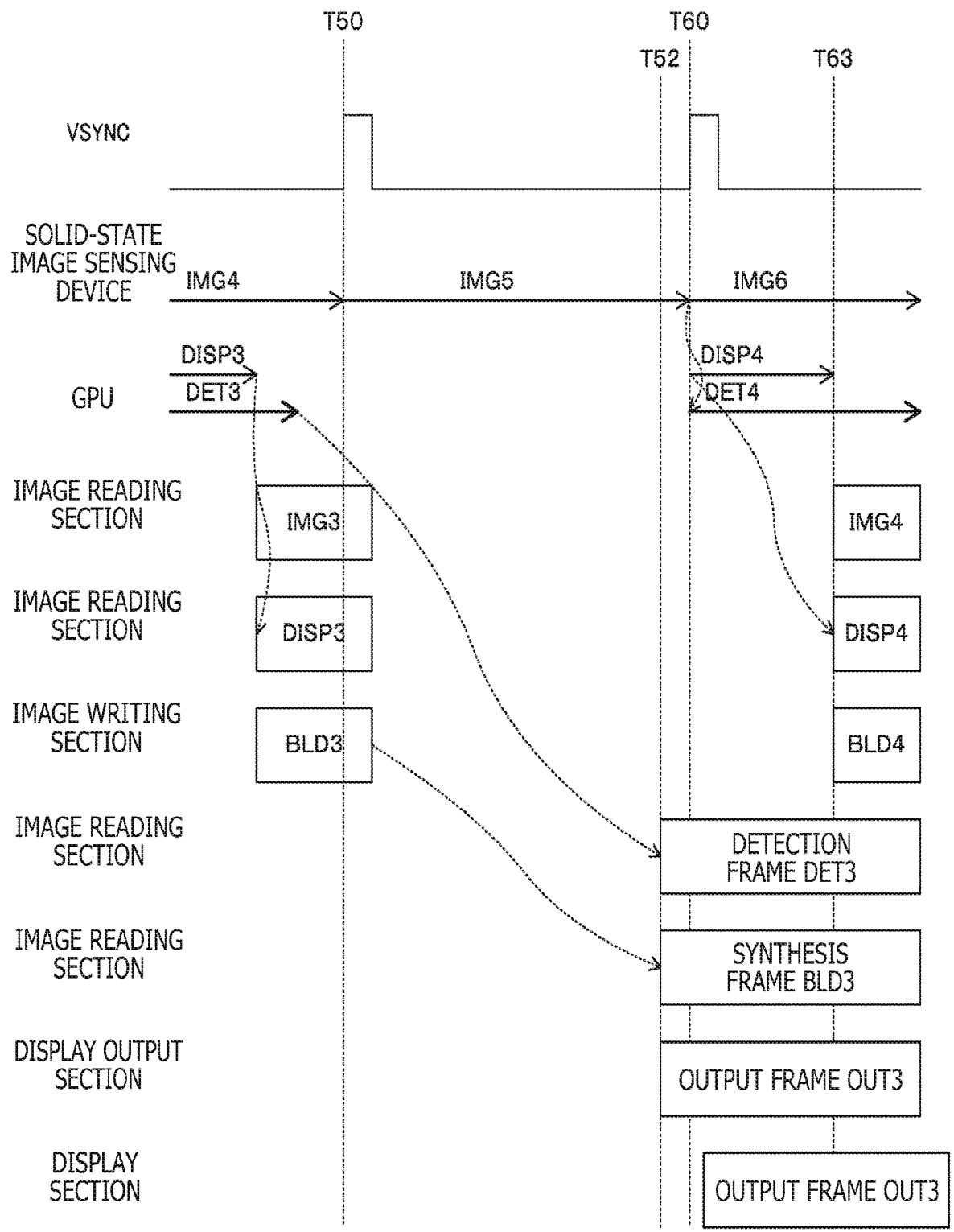
FIG. 9 is a timing chart illustrating an example of the synthesis processing of a comparison example.

FIG. 9 is a timing chart illustrating an example of each synthesis processing of the first embodiment and a comparison example of the present technology. The timing chart illustrates an example of the synthesis processing of the comparison example in which the synthesis is started when the generation of the display frame is completed instead of the timing of the interruption signal INI1.

A terminal of the comparison example starts drawing the detection frame DET3 and the display frame DISP3 in a certain period of the vertical synchronizing signal VSYNC.

Here, it is assumed that the generation of the display frame DISP3 is delayed due to the scroll display of messages or the like to delay a start of the synthesis and the synthesis is not completed by timing T50 at the time of completing the period of the vertical synchronizing signal VSYNC. In this case, in the terminal of the comparison example, the detection frame DET3 and the synthesis frame BLD3 are read and synthesized at timing T52 immediately before the next timing T60 of the vertical synchronizing signal VSYNC. The detection frame DET3 is a frame in which the output ought to be started in the period (immediately before the timing T50) of the previous imaged frame IMG4. As described above, in the comparison example in which the synthesis is started when the generation of the display frame is completed, a deviation between the detection frame and the imaged frame is generated in the output frame.

To solve the above problem, as exemplified in FIG. 8, even if the generation of the display frame is delayed, the AR terminal 100 starts the synthesis at the timing T41 etc. of the interruption signal INI1. The interruption timing T41 etc. are set so as to complete the synthesis in the period of the vertical synchronizing signal VSYNC. Therefore, the synthesis is started at the above timing and thereby the synthesis can be completed in the period of the vertical synchronizing signal VSYNC. Further, the deviation between the detection frame and the imaged frame can be suppressed from being generated in the output frame.

[Operation Example of AR Terminal]

Figure 10:
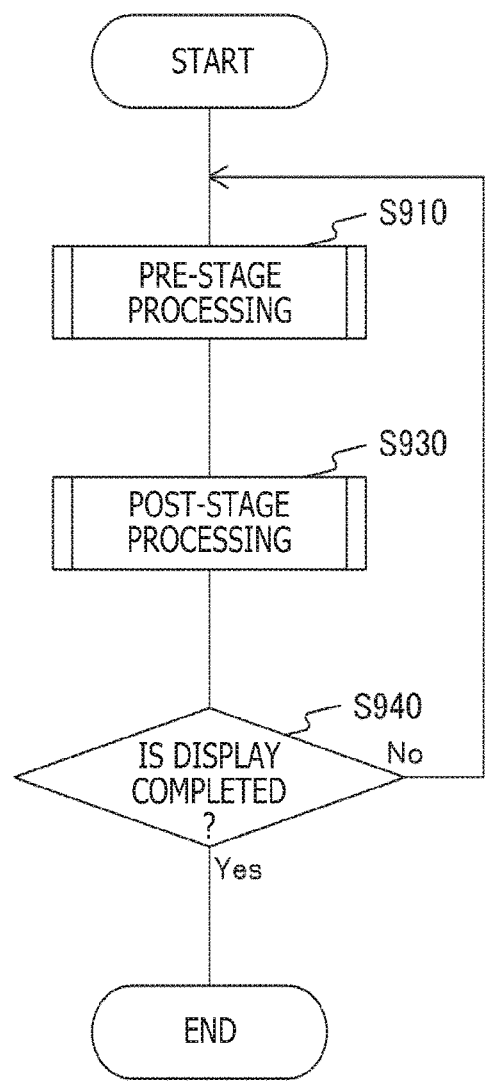
FIG. 10 is a flowchart illustrating an example of operations of the AR terminal according to the first embodiment of the present technology.

FIG. 10 is a flowchart illustrating an example of operations of the AR terminal 100 according to the first embodiment of the present technology. The operations of the AR terminal 100 is started, for example, when predetermined application for displaying the output frame is executed. The AR terminal 100 performs pre-stage processing for synthesizing the imaged frame and the display frame (step S910). Further, the AR terminal 100 performs post-stage processing for synthesizing the detection frame and the synthesis frame (step S930). Then, the AR terminal 100 determines whether or not the display ought to be completed on the basis of an operation of the user or the like (step S940). If the display ought not to be completed (Step S940: No), the AR terminal 100 repeatedly performs step S910 or later. On the other hand, if the display ought to be completed (step S940: Yes), the AR terminal 100 completes an operation for the display.

Figure 11:
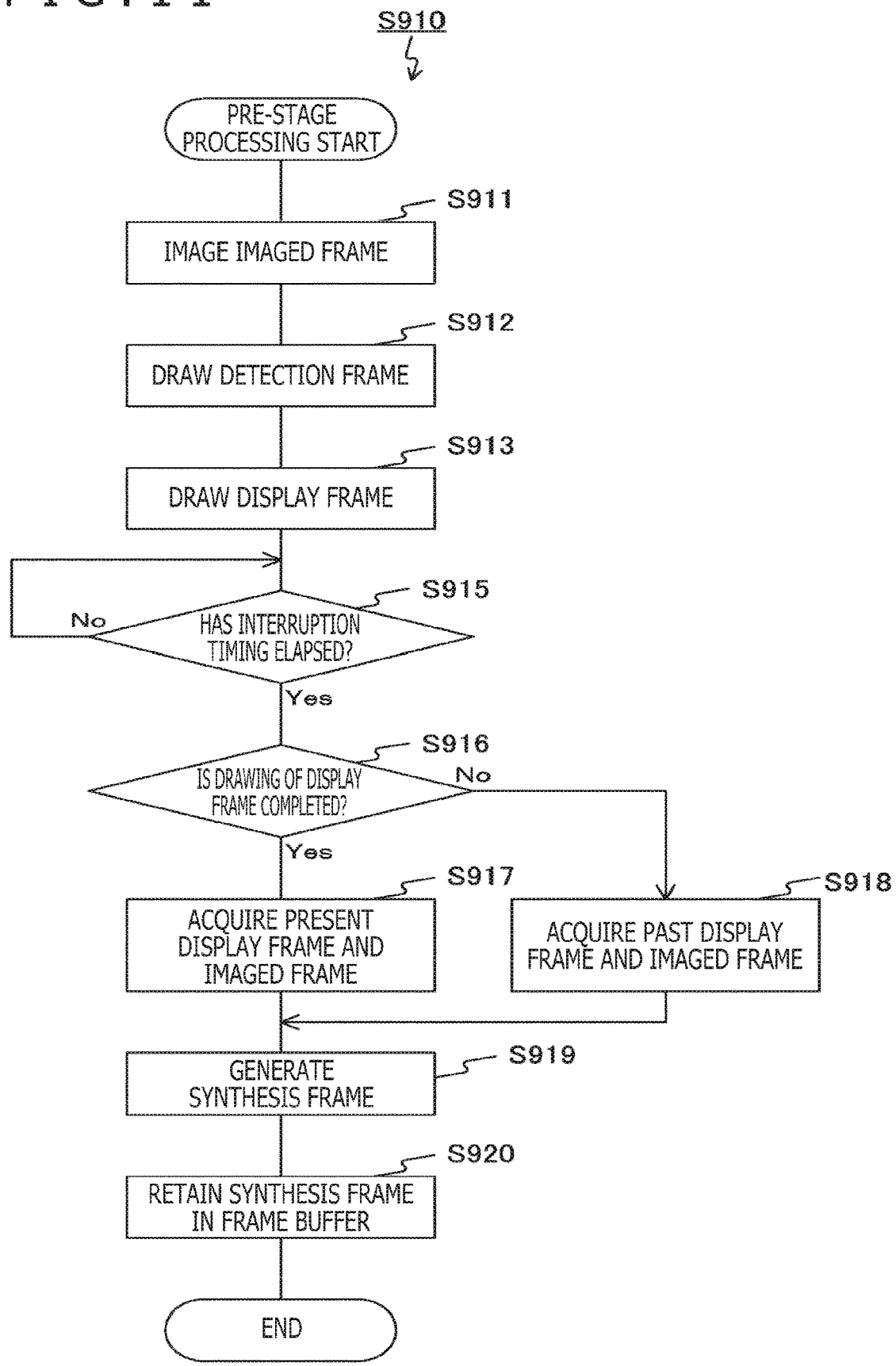
FIG. 11 is a flowchart illustrating an example of pre-stage processing according to the first embodiment of the present technology.

FIG. 11 is a flowchart illustrating an example of the pre-stage processing according to the first embodiment of the present technology. The solid-state image sensing device 103 starts imaging the imaged frame (step S911). Further, the GPU 135 detects persons from the imaged frame and starts drawing the detection frame (step S912). In addition, the GPU 135 starts drawing the display frame (step S913). Then, the pre-stage image synthesis section 210 determines whether or not the interruption timing indicated by the interruption signal INI1 has elapsed (step S915). If the interruption timing has not elapsed (step S915: No), the pre-stage image synthesis section 210 repeats step S915.

On the other hand, if the interruption timing has elapsed (step S915: Yes), the synthesis control section 217 determines whether or not the drawing (generation) of the present display frame is completed (step S916). If the drawing of the present display frame is completed (step S916: Yes), the pre-stage image synthesis section 210 acquires the present display frame and the imaged frame from the frame buffer in accordance with control of the synthesis control section 217 (step S917).

On the other hand, if the drawing of the present display frame is not completed (step S916: No), the pre-stage image synthesis section 210 acquires the past display frame and the imaged frame from the frame buffer in accordance with control of the synthesis control section 217 (step S918). After step S917 or S918, the pre-stage image synthesis section 210 generates the synthesis frame (step S919). The pre-stage image synthesis section 210 retains the synthesis frame in the frame buffer (step S920) and completes the pre-stage processing.

Figure 12:
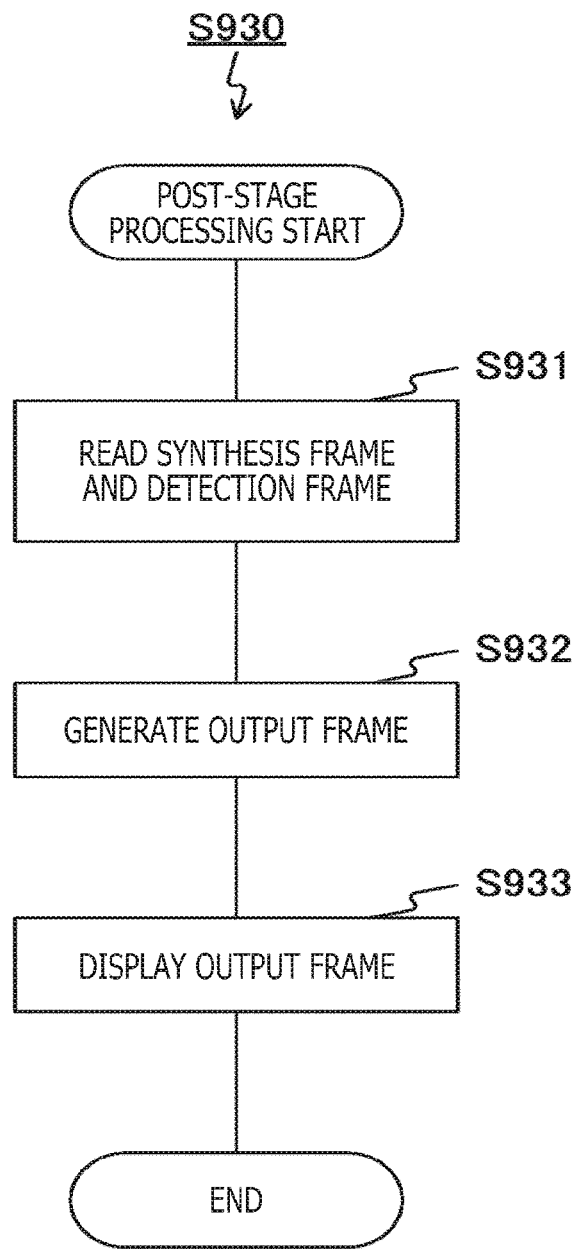
FIG. 12 is a flowchart illustrating an example of post-stage processing according to the first embodiment of the present technology.

FIG. 12 is a flowchart illustrating an example of the post-stage processing according to the first embodiment of the present technology. The post-stage image synthesis section 220 reads the synthesis frame and the detection frame from the frame buffer at the timing of the interruption signal INI2 in accordance with control of the synthesis control section 227 (step S931) and generates the output frame (step S932). Then, the display section 102 displays the output frame (step S933). After step S933, the AR terminal 100 completes the post-stage processing.

As described above, according to the first embodiment of the present technology, when the display frame is not generated by specific timing, the AR terminal 100 acquires the past display frame and synthesizes the display frame. Therefore, a start of the synthesis can be prevented from being delayed at the timing or later. Thereby, the AR terminal 100 can complete the synthesis in the period of the vertical synchronizing signal and suppress the deviation between the detection frame and the imaged frame.

2. Second Embodiment

In the above-mentioned first embodiment, even if generation of both two frames to be synthesized is completed before the timing of the interruption signal INI1, the AR terminal 100 reads the frames to be synthesized and starts the synthesis when the timing has elapsed. In the configuration, timing at which the frame to be synthesized is read is fixed and load of the memory bus 119 becomes heavy at the fixed timing. To solve the above problem, even if the timing is any timing except the timing of the interruption signal INI1, when possible, the AR terminal 100 preferably starts the synthesis and distributes the load of the memory bus 119. The AR terminal 100 according to a second embodiment differs from that according to the first embodiment in a position in which the load of the memory bus 119 is distributed.

Figure 13:
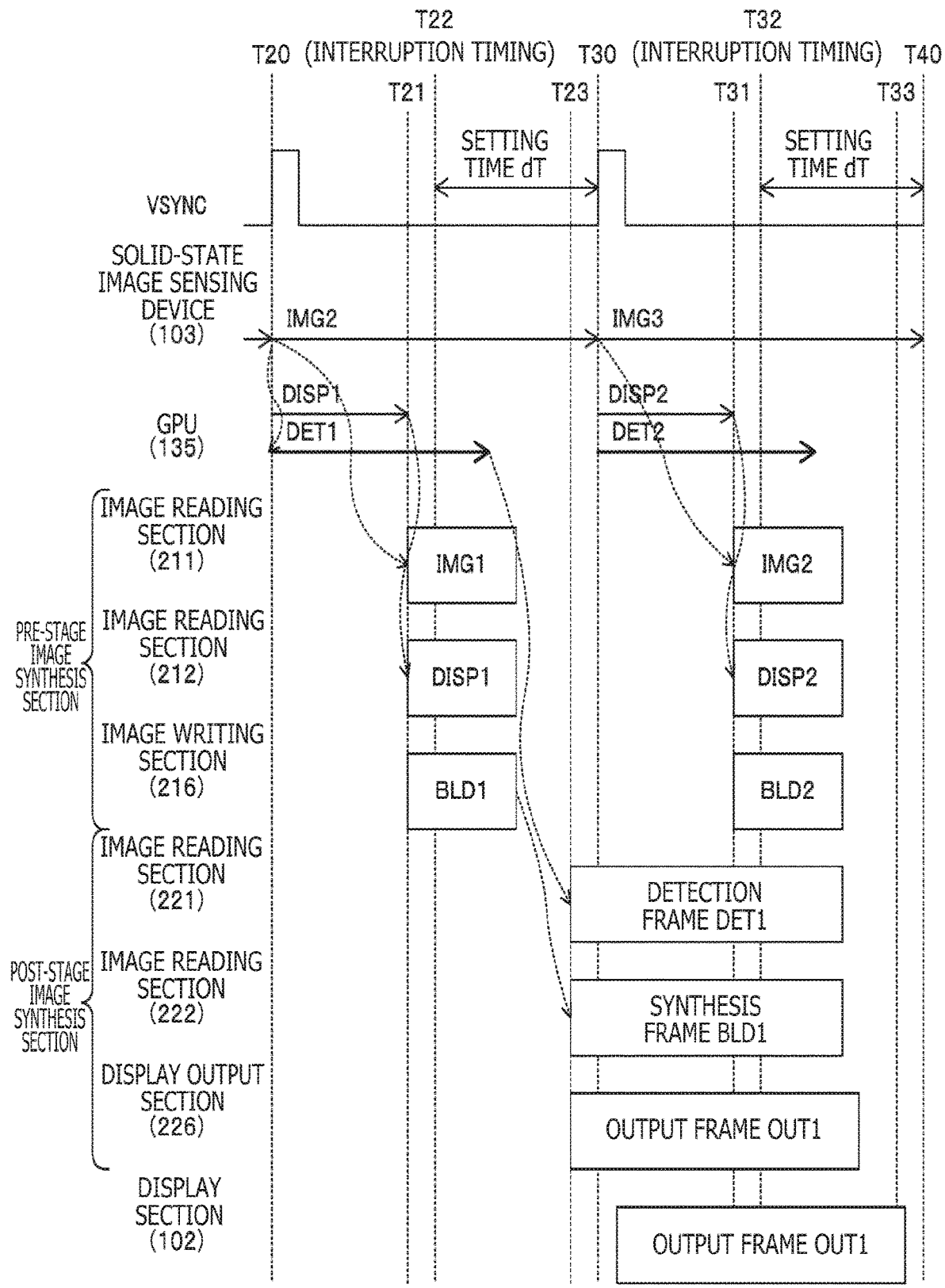
FIG. 13 is a timing chart illustrating an example of the synthesis processing of a first output frame of the AR terminal according to a second embodiment of the present technology.

FIG. 13 is a timing chart illustrating an example of the synthesis processing of a first output frame of the AR terminal according to the second embodiment of the present technology.

It is assumed that the timing of the interruption signal INI1 is set to T22 and the generation of the display frame DISP1 is completed at the timing T21 before the above timing. At the timing T21, the pre-stage image synthesis section 210 reads the imaged frame IMG1 and the display frame DISP1 from the frame buffer and starts synthesizing them.

Figure 14:
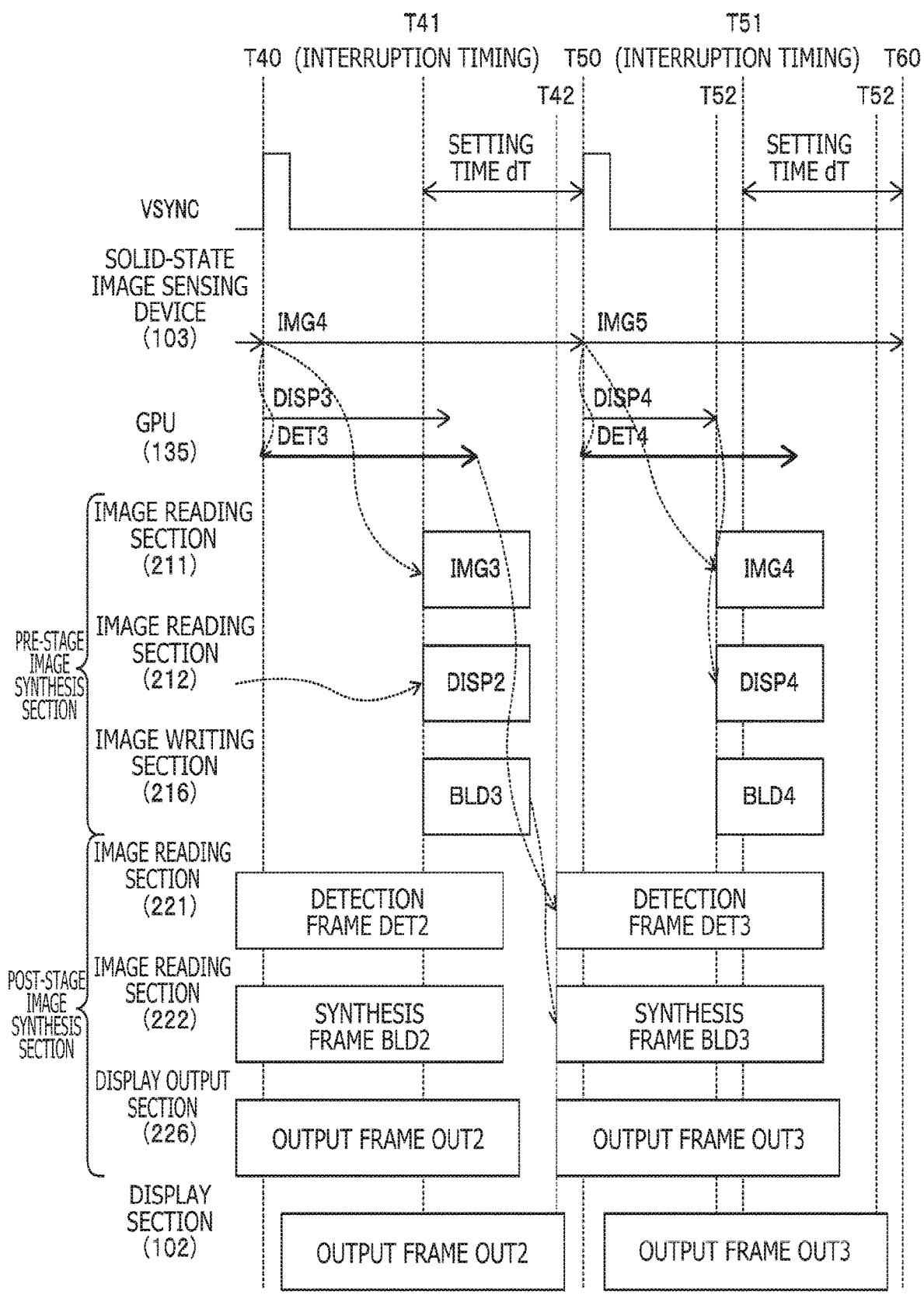
FIG. 14 is a timing chart illustrating an example of the synthesis processing of a second output frame and a third output frame of the AR terminal according to the second embodiment of the present technology.

FIG. 14 is a timing chart illustrating an example of the synthesis processing of a second output frame and a third output frame of the AR terminal according to the second embodiment of the present technology.

It is assumed that the generation of the display frame DISP3 is not completed at the timing T41 of the interruption signal INI1. At the timing T41, the pre-stage image synthesis section 210 reads the imaged frame IMG3 and the past display frame DISP2 from the frame buffer and starts synthesizing them.

As exemplified in FIGS. 13 and 14, when the pre-stage image synthesis section 210 according to the second embodiment completes the generation of the display frame before the interruption timing, the second embodiment differs from the first embodiment in a point in which the synthesis is started at the time point. Thereby, since read timing of the frame from the memory 110 is not fixed, the load of the memory bus 119 can be distributed.

Figure 15:
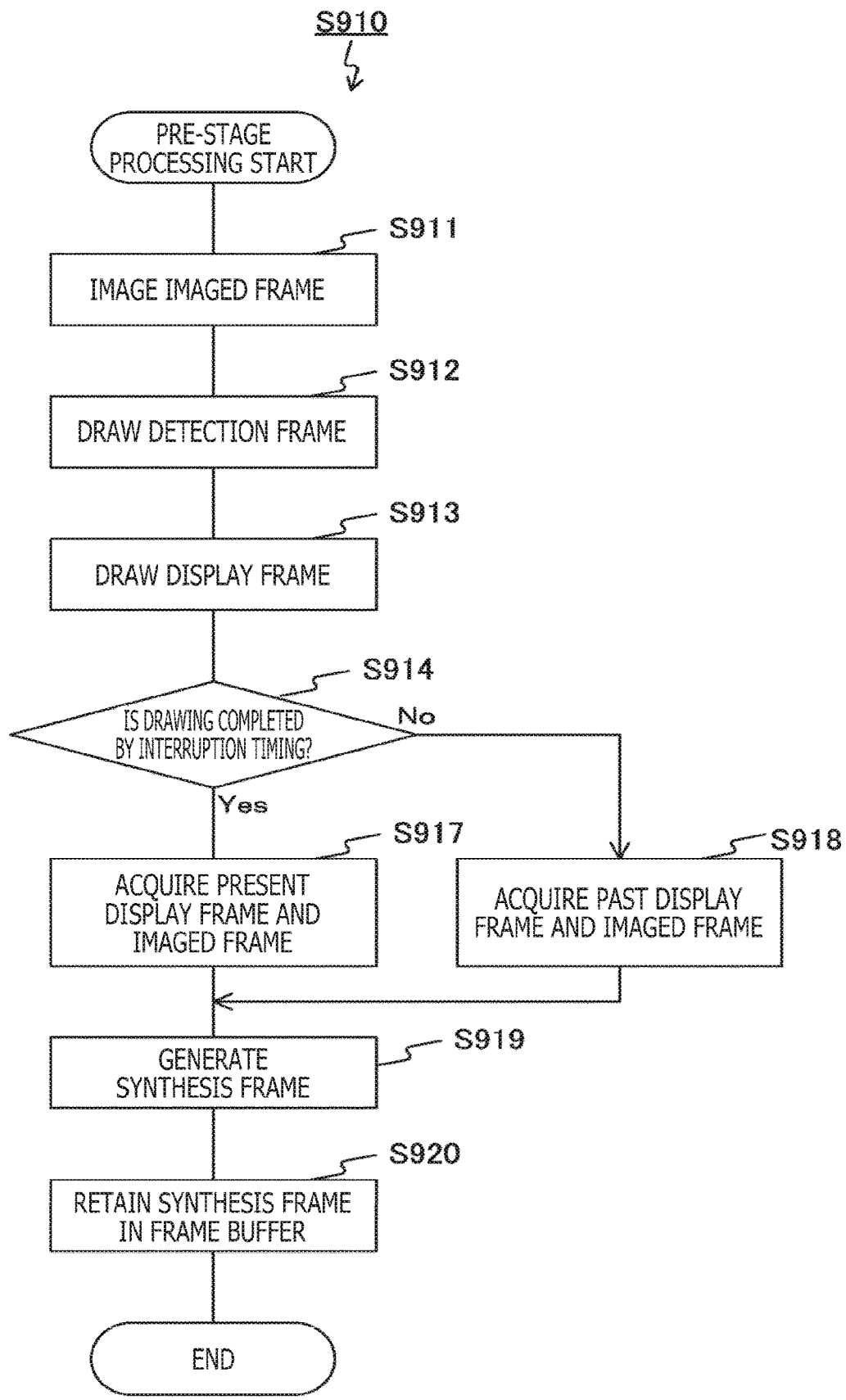
FIG. 15 is a flowchart illustrating an example of the pre-stage processing according to the second embodiment of the present technology.

FIG. 15 is a flowchart illustrating an example of the pre-stage processing according to the second embodiment of the present technology. The pre-stage processing according to the second embodiment differs from that according to the first embodiment in a point in which step S914 is performed in place of steps S915 and S916.

After drawing of the present display frame is started (step S913), the synthesis control section 217 determines whether or not the drawing of the display frame is completed by the interruption timing (step S914). If the drawing of the display frame is completed (step S914: Yes), the pre-stage image synthesis section 210 performs step S917. On the other hand, if the drawing of the display frame is not completed (step S914: No), the pre-stage image synthesis section 210 performs step S918.

As described above, according to the second embodiment of the present technology, the AR terminal 100 starts the synthesis even before the interruption timing at a time point at which the frame to be synthesized is generated. Therefore, the frame can be read via the memory bus 119 even at timing other than the interruption timing. The process permits the load of the memory bus 119 to be distributed.

3. Third Embodiment

According to the above-mentioned first embodiment, the AR terminal 100 reads the past display frame when the drawing is delayed. Further, the AR terminal 100 suppresses the deviation between the imaged frame and the detection frame and ensures consistency of display contents. However, as the frequency of occurrence of reading of the past display frame is higher, the frequency of updating of the frame buffer of the display frame is more reduced. In a case in which a person to be detected is increased even in the detection frame, or the like, the frequency of updating of the frame buffer of the detection frame may be reduced. When each frequency of updating of the frame buffers to be synthesized is different from each other, the consistency may not be ensured by the synthesis frame obtained by synthesizing them and image quality may be reduced. In this case, the AR terminal 100 changes a synthesis condition such as resolution of a frame to be synthesized or the number of the synthesis frames, and thereby each frequency of updating is preferably adjusted regularly. The AR terminal 100 according to the third embodiment differs from that according to the first embodiment in a point in which the frequency of updating of the frame buffer is adjusted.

Figure 16:
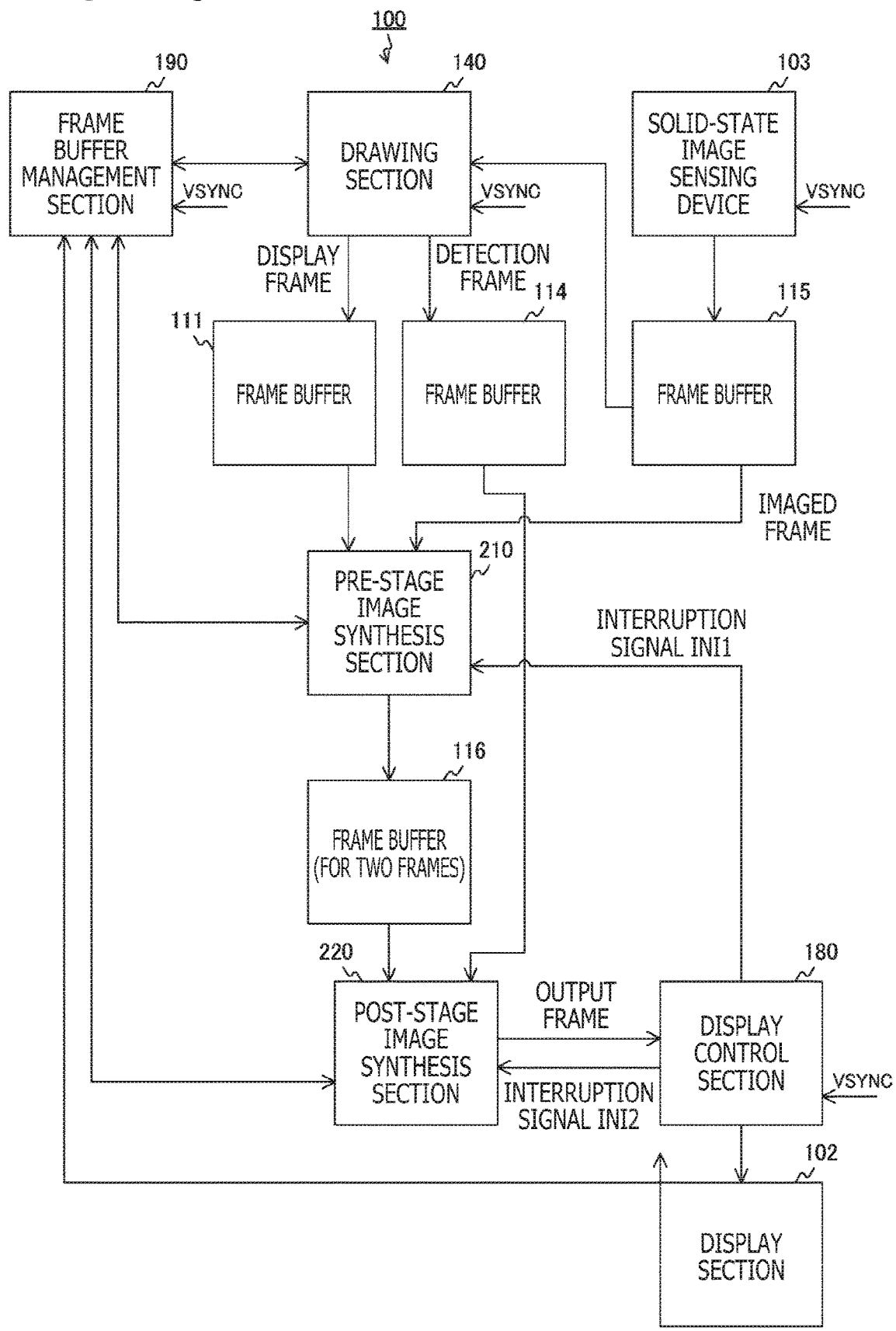
FIG. 16 is a block diagram illustrating a functional configuration example of the AR terminal according to a third embodiment of the present technology.

FIG. 16 is a block diagram illustrating a functional configuration example of the AR terminal 100 according to the third embodiment of the present technology. The AR terminal 100 according to the third embodiment differs from that according to the first embodiment in a point in which a frame buffer management section 190 is further included.

The frame buffer management section 190 measures, as a frame rate, each frequency of updating of the frame buffers 111, 114, and 115. The frame buffer management section 190 acquires snap shot information including information required to calculate the frame rate at the timing of the interruption signals INI1 and INI2. Further, the frame buffer management section 190 transmits a non-update counter value in the snap shot information to the drawing software according to an inquiry. Note that the frame buffer management section 190 is an example of a management section described in scope of claims. Non-update counter information will be described below.

On the basis of the non-update counter value from the frame buffer management section 190, the drawing section 140 requests the synthesis condition such as resolution of the frame to be synthesized, the number of the synthesis frames, or the interruption timing to be changed if necessary and adjusts the frequency of updating (frame rate).

FIG. 17 is a diagram illustrating an example of a data structure of frame buffer management information 600 according to the third embodiment of the present technology. The frame buffer management information 600 is information used by the frame buffer management section 190 and includes frame buffer identification information, the next synthesized plane information, the present synthesized plane information, and the non-update counter value.

The frame buffer identification information is information for identifying the frame buffers 111, 114, and 115 respectively. For example, a frame buffer identification information "01" is allocated to the frame buffer 111, and pieces of frame buffer identification information "02" and "03" are allocated to the frame buffers 114 and 115.

The next synthesized plane information is information indicating which of the A plane and the B plane is to be synthesized and that indicating longitudinal and horizontal sizes (resolution) of an area written in the plane in the next period of the vertical synchronizing signal VSYNC. For example, the next synthesized plane information includes the next synthesized plane NF and resolution NA for each frame buffer identification information.

The present synthesized plane information is information indicating that which of the A plane and the B plane is to be synthesized and that indicating the resolution of an area written in the plane in the present period of the vertical synchronizing signal VSYNC. For example, the present synthesized plane information includes the present synthesized plane PF and resolution PA for each frame buffer identification information.

The above-mentioned next synthesized plane information is set to the same value as that of the present synthesized plane information at the time of initialization. The next synthesized plane information is changed in accordance with the request at timing of the next synthesized plane switching request from the drawing software. Further, the present synthesized plane information is updated to the same value as that of the next synthesized plane information at each timing of the interruption signals INI1 and INI2 for starting the synthesis. Specifically, the next synthesized plane information and the present synthesized plane information are updated to the same value at the timing of the interruption signal INI1 or INI2.

The non-update counter value is a value in which the number of times in which the frame buffer of the frame is not updated is counted in synchronization with the synthesis timing (INI1 or INI2) of the frame during the time up to the present from a time at which a certain frame is to be synthesized.

The present synthesized plane information and the non-update counter value are acquired as the above-mentioned snap shot information by the frame buffer management section 190 at the timing of the interruption signal INI1 or INI2. When the snap shot information is acquired, the frame buffer management section 190 first compares the present synthesized plane information and next synthesized plane information corresponding to the frame to be measured. If the next synthesized plane information and the present synthesized plane information are the same, the corresponding non-update counter value is incremented. Next, the frame buffer management section 190 copies the next synthesized plane information to be synthesized at this timing of the interruption signal INI1 or INI2 on the present synthesized plane information. For example, in a case in which the B plane is set to the next synthesized plane information, even the present synthesized plane information is updated to the B plane.

Note that in a case in which the frame buffer is allowed to retain three frames or more, any one of three planes or more is set to the next synthesized plane information and the present synthesized plane information respectively.

Figure 18:
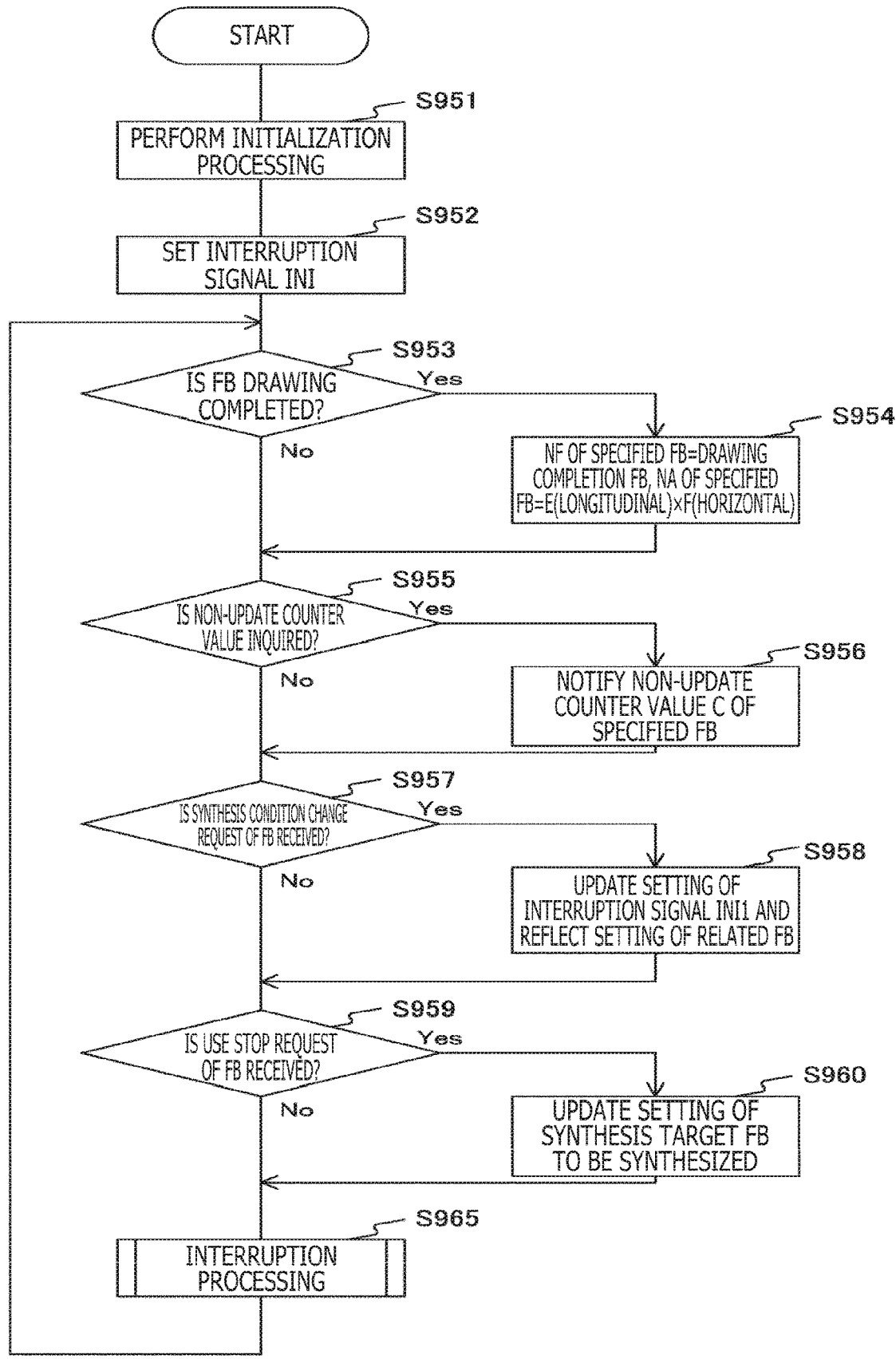
FIG. 18 is a flowchart illustrating an example of operations of a frame buffer management section according to the third embodiment of the present technology.

FIG. 18 is a flowchart illustrating an example of operations of the frame buffer management section 190 according to the third embodiment of the present technology. The frame buffer management section 190 performs processing for initializing the frame buffer management information (step S951). For example, the same initial value is set to the next synthesized plane information and the present synthesized plane information. Further, "0" is set to the non-update counter value. Then, the frame buffer management section 190 sets the timing of the interruption signal INI1 to the display control section 180 (step S952).

Then, the frame buffer management section 190 determines whether or not the next synthesized plane switching request is received from the drawing software in the drawing section 140 (that is, the drawing of the frame buffer is completed) (step S953). The next synthesized plane switching request indicates a signal for requesting the switching of the next synthesized plane. If the next synthesized plane switching request is received (step S953: Yes), the frame buffer management section 190 switches the next synthesized plane NF of the frame buffer specified by the drawing software and sets the resolution NA of the plane (step S954). If the next synthesized plane NF is the B plane, the B plane is switched to the A plane. By contrast, if the next synthesized plane NF is the A plane, the A plane is switched to the B plane.

If the next display plane switching request is not received (step S953: No) or after step S954, the frame buffer management section 190 determines whether or not an inquiry of the non-update counter value is received from the drawing software in the drawing section 140 (step 955). If the inquiry is received (step S955: Yes), the frame buffer management section 190 notifies the drawing software of the non-update counter value of the specified frame buffer (step S956).

If the inquiry of the non-update counter value is not received (step S955: No) or after step S956, the frame buffer management section 190 determines whether or not the FB synthesis condition change request is received from the drawing software (step S957). The FB synthesis condition change request indicates a signal for requesting a change in the number of the synthesis frames or the interruption timing. If the FB synthesis condition change request is received (step S957: Yes), the frame buffer management section 190 changes setting of the timing of the interruption signal INI1 and reflects setting of the related frame buffer (step S958).

If the FB synthesis condition change request is not received (step S957: No) or after step S958, the frame buffer management section 190 determines whether or not the FB use stop request is received from the drawing software or the solid-state image sensing device 103 (step S959). The FB use stop request indicates a signal in which the drawing software requests a use stop of the frame buffer corresponding to the frame to the GPU 135 when the generation of the display frame or the detection frame is stopped. Further, the FB use stop request is transmitted from the drawing software to the GPU 135 and the frame buffer management section 190. If the FB use stop request is received (step S959: Yes), the frame buffer management section 190 updates setting of the frame buffer to be synthesized (step S960).

If the FB use stop request is not received (step S959: No) or after step S960, the frame buffer management section 190 performs interruption processing in accordance with an input of the interruption signal (step S965). After step S965, the frame buffer management section 190 repeatedly performs step S953 or later.

Figure 19:
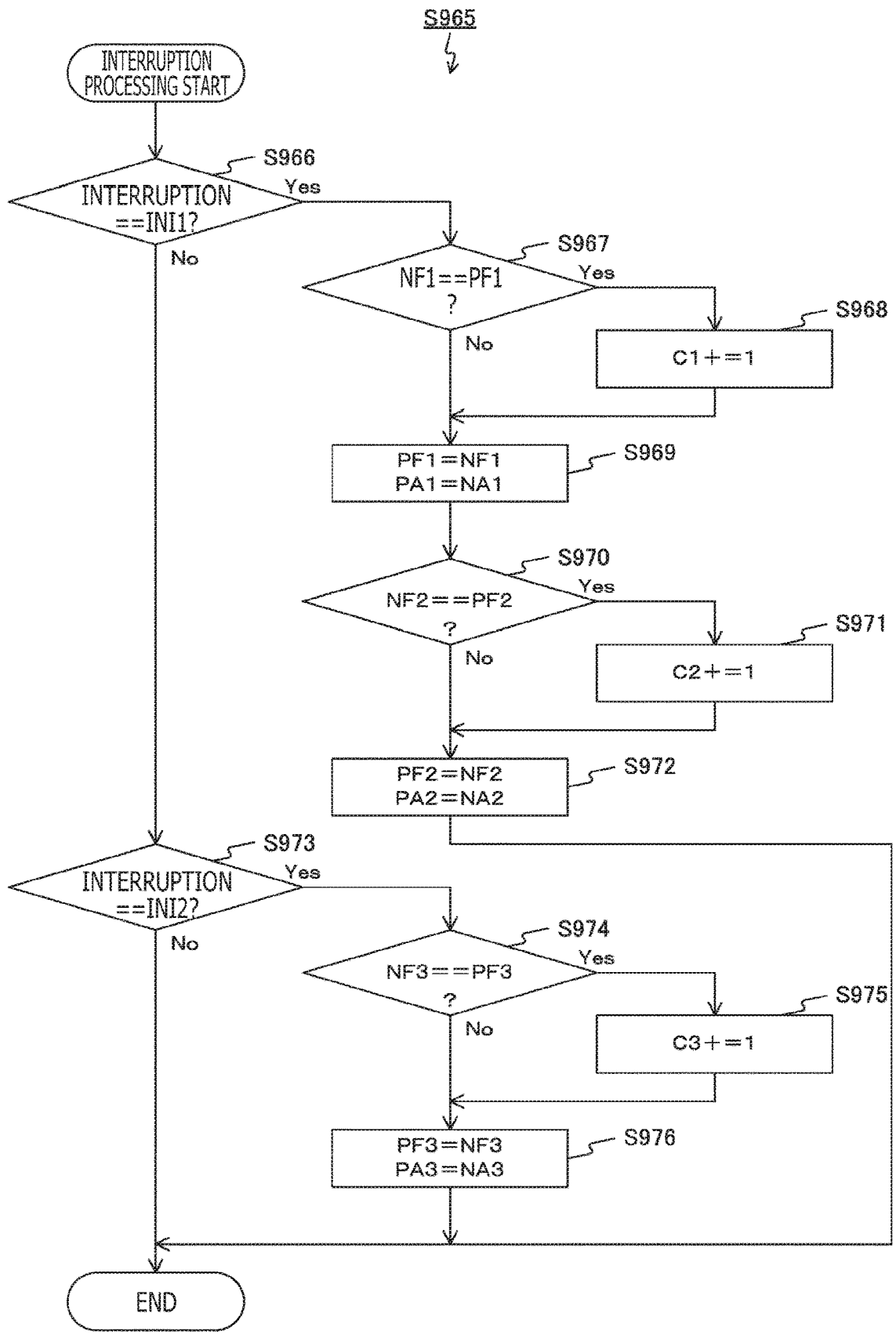
FIG. 19 is a flowchart illustrating an example of interruption processing according to the third embodiment of the present technology.

FIG. 19 is a flowchart illustrating an example of the interruption processing according to the third embodiment of the present technology. The frame buffer management section 190 determines whether or not the interruption signal for starting the synthesis is INI1 (step S966). If the interruption signal is INI1 (step S966: Yes), the frame buffer management section 190 determines whether or not the next synthesized plane NF1 corresponding to a first frame (imaged frame etc.) to be synthesized and the present synthesized plane PF1 are matched with each other (step S967). If the next synthesized plane NF1 and the present synthesized plane PF1 are matched with each other (step S967: Yes), the frame buffer management section 190 increments a non-update counter C1 of the frame (step S968).

If the next synthesized plane NF1 and the present synthesized plane PF1 are not matched with each other (step S967: No) or after step S968, the frame buffer management section 190 updates the present synthesized plane PF1 and the resolution PA1 to the next display plane NF1 and the resolution NA1 (step S969).

Then, the frame buffer management section 190 determines whether or not the next synthesized plane NF2 corresponding to a second frame (display frame etc.) to be synthesized and the present synthesized plane PF2 are matched with each other (step S970). If the next synthesized plane NF2 and the present synthesized plane PF2 are matched with each other (step S970: Yes), the frame buffer management section 190 increments a non-update counter C2 of the frame (step S971).

If the next synthesized plane NF2 and the present synthesized plane PF2 are not matched with each other (step S970: No) or after step S971, the frame buffer management section 190 updates the present synthesized plane PF2 and the resolution PA2 to the next display plane NF2 and the resolution NA2 (step S972).

If the interruption signal is not INI1 (step S966: No), the frame buffer management section 190 determines whether or not the interruption signal is INI2 (step S973). If the interruption signal is INI2 (step S973: Yes), the frame buffer management section 190 determines whether or not the next synthesized plane NF3 corresponding to a third frame (detection frame etc.) to be synthesized and the present synthesized plane PF3 are matched with each other (step S974). If the next synthesized plane NF3 and the present synthesized plane PF3 are matched with each other (step S974: Yes), the frame buffer management section 190 increments a non-update counter C3 of the frame (step S975).

If the next synthesized plane NF3 and the present synthesized plane PF3 are not matched with each other (step S974: No) or after step S975, the frame buffer management section 190 updates the present synthesized plane PF3 and the resolution PA3 to the next display plane NF3 and the resolution NA3 (step S976).

If the interruption signal is not INI1 (step S973: No), after step S972, or after step S976, the frame buffer management section 190 performs various other processes and completes the interruption processing.

Figure 20:
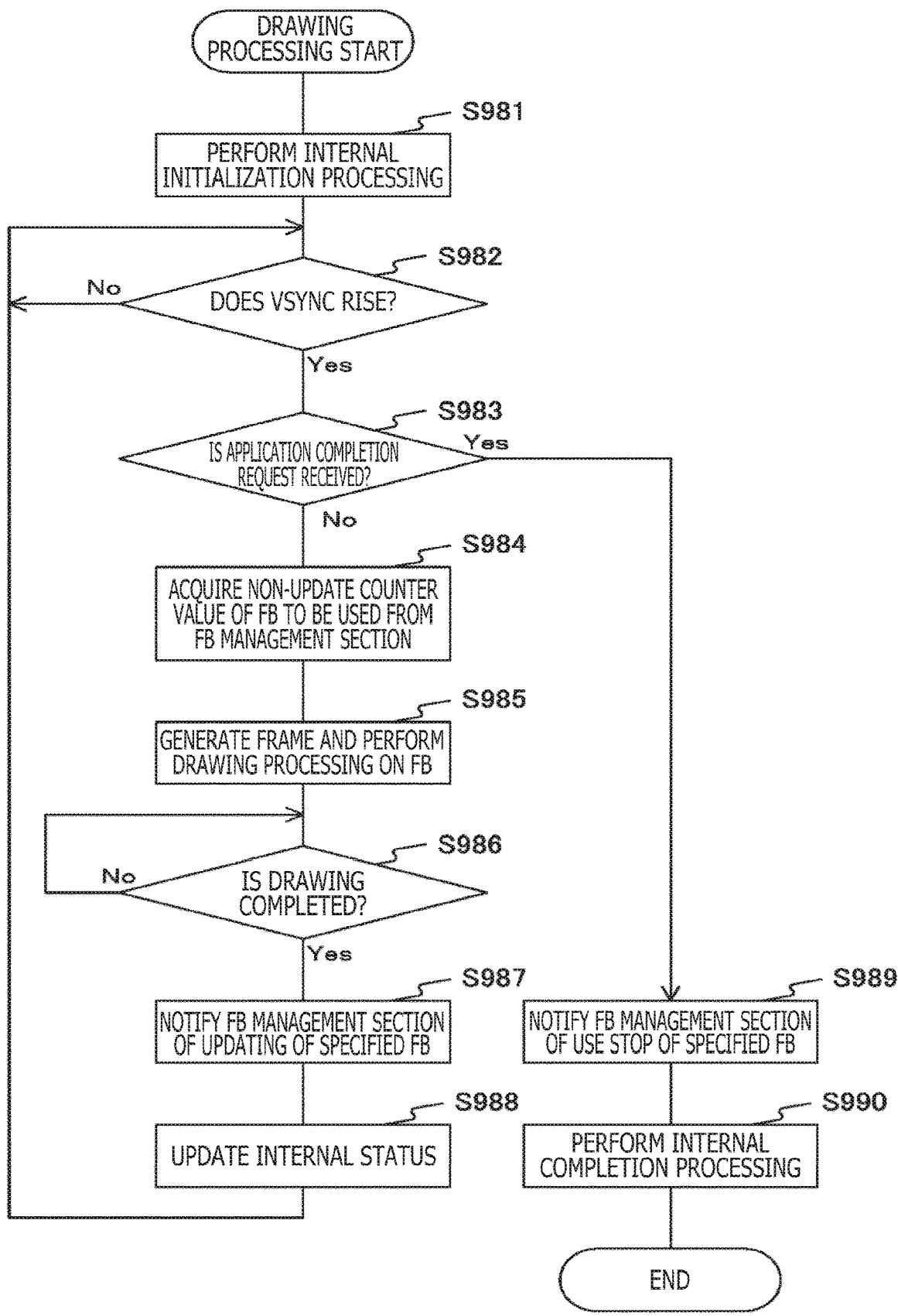
FIG. 20 is a flowchart illustrating an example of drawing processing according to the third embodiment of the present technology.

FIG. 20 is a flowchart illustrating an example of the drawing processing according to the third embodiment of the present technology. The drawing processing is started, for example, by the drawing software in the drawing section 140 when predetermined application is performed.

The drawing software performs processing for initializing various internal statuses (step S981) and determines whether or not the vertical synchronizing signal VSYNC rises up (step S982). If the vertical synchronizing signal VSYNC rises up (step S982: Yes), the drawing software determines whether or not an application completion request is received (step S983). If the application completion request is not received (step S983: No), the drawing software transmits the inquiry of the non-update counter value to the frame buffer management section 190 and acquires the non-update counter value. Then, the drawing software determines whether or not the non-update counter value is more than an assumed value (specifically, the frame rate is reduced more than the assumed value). Further, the drawing software performs setting on the basis of the determination and allows the frame to be generated. In addition, the drawing software allows writing (drawing) processing in the frame buffer of the generated frame to be performed (step S984). For example, if the frame rate is reduced more than the assumed value, the drawing software sets lower resolution and sets a smaller number of the synthesis frames. By the next synthesized plane switching request based on the setting, a time of the synthesis processing can be shortened and the frame rate can be adjusted.

The drawing software determines whether or not a notification of the drawing completion is received from the GPU 135 (in other words, the drawing is completed) (step S986). If the drawing is not completed (step S986: No), the drawing software repeats step S986.

If the drawing is completed (step S986: Yes), the drawing software transmits the next synthesized plane switching request to the frame buffer management section 190 (step S987). Then, the drawing software updates the internal status (step S988). If the vertical synchronizing signal VSYNC does not rise up (step S982: No) or after step S988, the drawing software repeats step S982.

Further, if the application completion request is received (step S983: Yes), the drawing software transmits the FB use stop request corresponding to the application to the GPU 135 and the frame buffer management section 190 (step S989). Then, the drawing software performs predetermined internal completion processing (step S990) and completes the drawing processing.

According to the above-mentioned processing, even if each of the drawing times of the frame to be synthesized is fluctuated, the AR terminal 100 can regularly adjust the frequency of updating (frame rate) of the frame buffer. Further, in a case in which the frame rate is desired to be prevented from being changed frequently in accordance with a fluctuation of the drawing time, the AR terminal 100 changes the synthesis condition to thereby reduce the frame rate of the output frame purposely.

Figure 21:
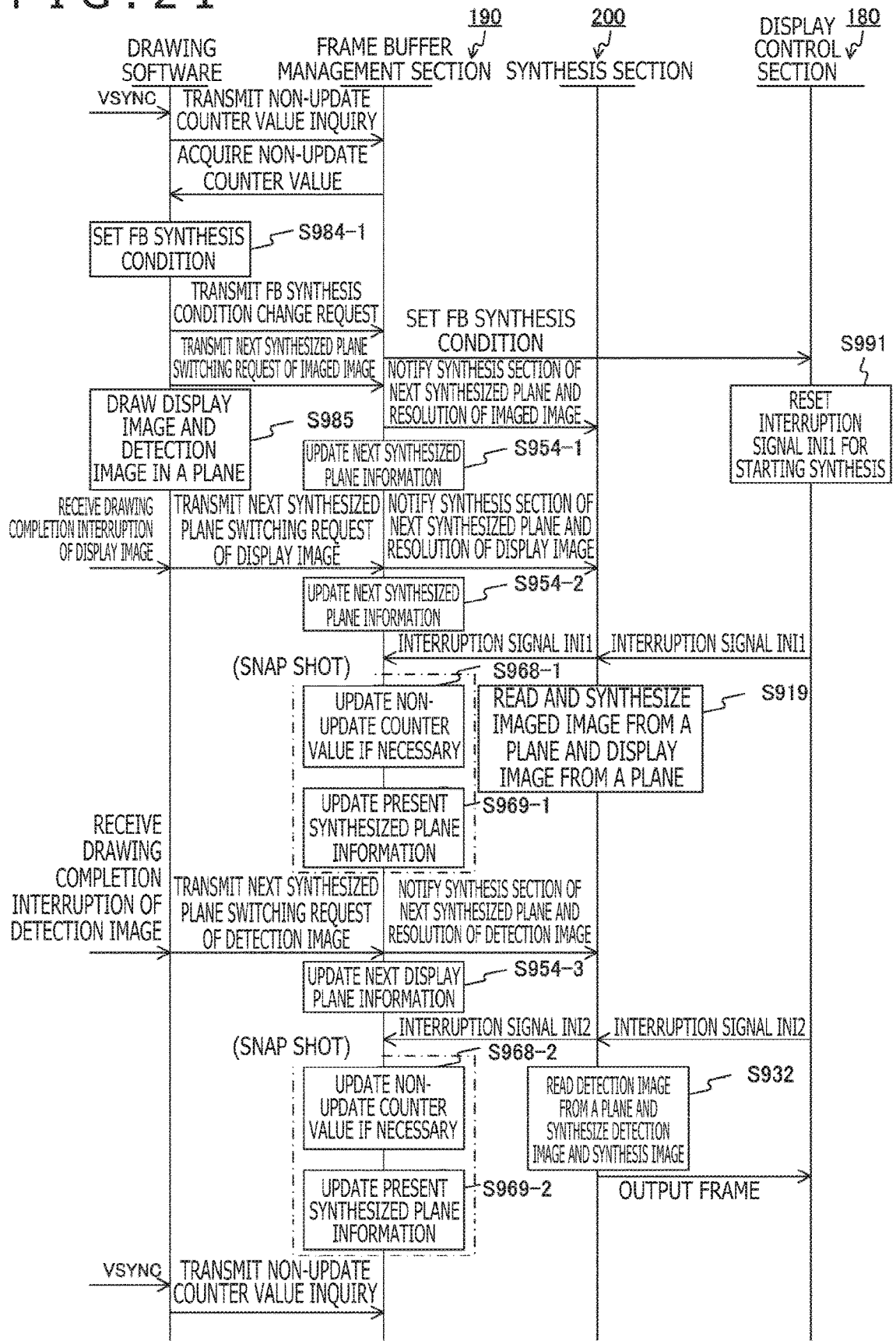
FIG. 21 is an example of a sequence diagram illustrating operations of the AR terminal when drawing of a display frame is completed before interruption timing according to the third embodiment of the present technology.

FIG. 21 is an example of a sequence diagram indicative of operations of the AR terminal 100 when the drawing of the display frame is completed before the interruption timing according to the third embodiment of the present technology.

When the vertical synchronizing signal VSYNC rises up, the drawing software transmits the inquiry of the non-update counter value to the frame buffer management section 190 and acquires the non-update counter value from the frame buffer management section 190. Then, the drawing software sets the FB synthesis condition on the basis of the non-update counter value (step S984-1) and transmits the FB synthesis condition change request to the frame buffer management section 190 on the basis of the setting. The frame buffer management section 190 sets the FB synthesis condition to the display control section 180 in accordance with the FB synthesis condition change request. Then, the display control section 180 resets the interruption signal INI1 for starting the synthesis (step S991).

Further, the drawing software transmits the next synthesized plane switching request regarding the frame buffer of the imaged frame (imaged image) to the frame buffer management section 190. Here, it is assumed that the imaged frame is written in the A plane. The frame buffer management section 190 notifies the synthesis section 200 of the next synthesized plane and resolution of the imaged frame and updates the next synthesized plane information (NF1 and NA1) of the imaged frame (step S954-1). The drawing software allows the GPU 135 to draw the display frame (display image) and the detection frame (detection image). For example, it is assumed that any of the display frame and the detection frame are written in the A plane.

Then, when the drawing completion interruption of the display frame is received from the GPU 135, the drawing software transmits the next synthesized plane switching request regarding the frame buffer of the frame to the frame buffer management section 190. Then, the frame buffer management section 190 notifies the synthesis section 200 of the next synthesized plane and resolution of the display frame and updates the next synthesized plane information (NF2 and NA2) of the display frame (step S954-2).

Here, it is assumed that the display control section 180 transmits the interruption signal INI1 for starting the synthesis after the drawing completion of the display frame. When the interruption signal INI1 is received, the frame buffer management section 190 acquires the snap shot information. Specifically, the frame buffer management section 190 updates the non-update counter values C1 and C2 (step S968-1) if necessary and updates the pieces of present synthesized plane information PF1, PF2, PA1, and PA2 (step S969-1).

Further, when the interruption signal INI1 is received, the synthesis section 200 reads and synthesizes the imaged frame and the display frame respectively from the A planes of the corresponding frame buffers (step S919). That is, the present display frame is synthesized.

Then, when the drawing completion interruption of the detection frame is received from the GPU 135, the drawing software transmits the next synthesized plane switching request regarding the frame buffer of the frame to the frame buffer management section 190. Then, the frame buffer management section 190 notifies the synthesis section 200 of the next synthesized plane and resolution of the detection frame and updates the next synthesized plane information (NF3 and NA3) of the detection frame (step S954-3).

When the interruption signal INI2 is received from the display control section 180, the frame buffer management section 190 acquires the snap shot information and the synthesis section 200 synthesizes the detection frame read from the A plane and the synthesis frame (step S932). Next, when the vertical synchronizing signal VSYNC rises up, the drawing software transmits the inquiry of the non-update counter value to the frame buffer management section 190.

As described above, in a case in which the display frame is generated by the timing of the interruption signal INI1, the present display frame and the imaged frame are synthesized.

Figure 22:
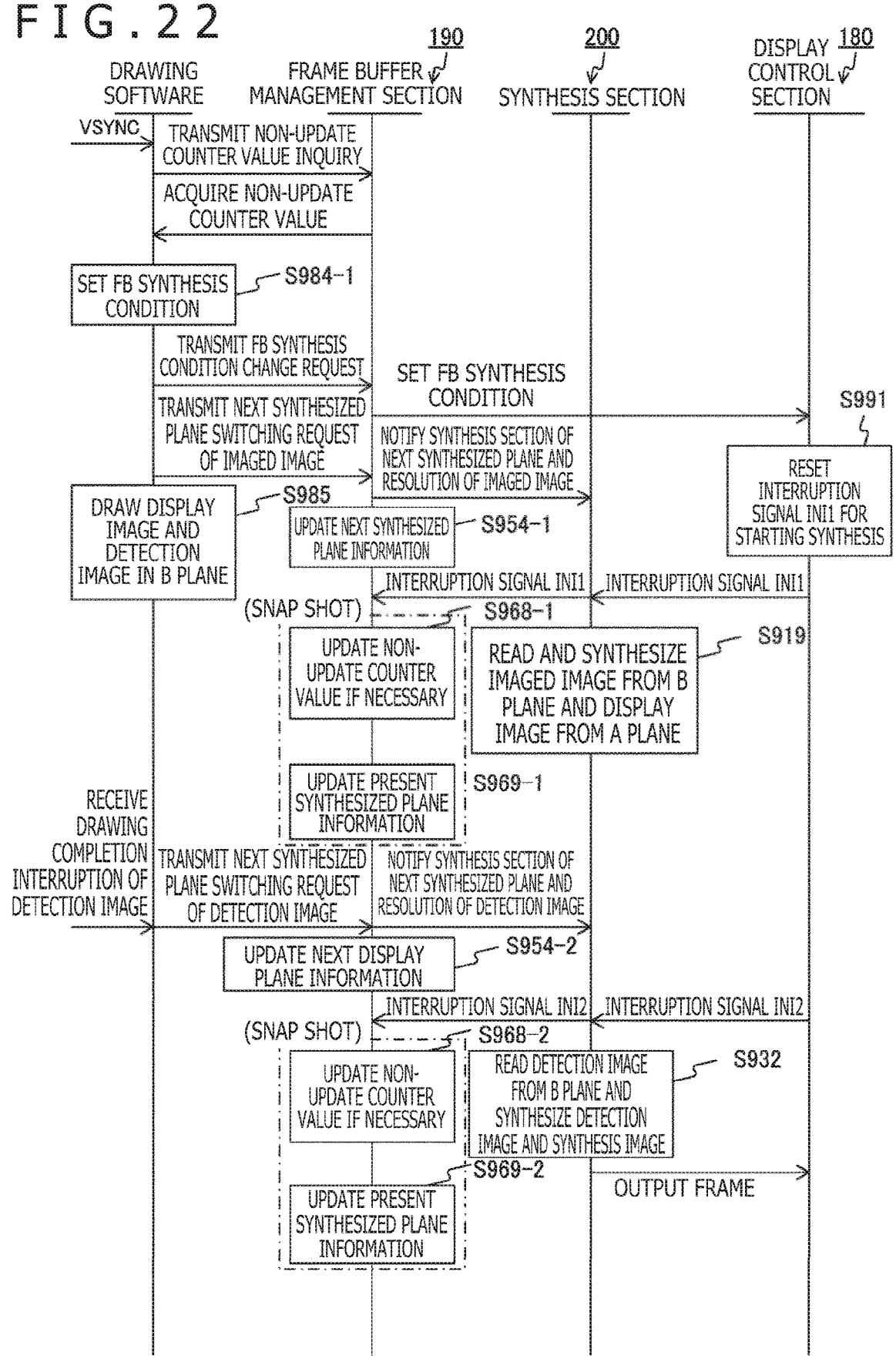
FIG. 22 is an example of a sequence diagram illustrating operations of the AR terminal when the drawing of the display frame is completed after the interruption timing according to the third embodiment of the present technology.

FIG. 22 is an example of a sequence diagram indicative of operations of the AR terminal 100 when the drawing of the display frame is completed after the interruption timing according to the third embodiment of the present technology. The sequence up to step S954-1 illustrated in FIG. 22 is the same as that illustrated in FIG. 21. Note, however, that, in step S985, any of the display frame (display image) and the detection frame (detection image) are written in the B plane. Further, even the imaged frame (imaged image) is written in the B plane.

Here, it is assumed that the display control section 180 transmits the interruption signal INI1 for starting the synthesis before the drawing of the display frame is completed. When the interruption signal INI1 is received, the frame buffer management section 190 acquires the snap shot information and the synthesis section 200 reads the imaged frame from the B plane and the display frame from the A plane and synthesizes them (step S919). That is, the past display frame is synthesized. The following sequence is the same as that illustrated in FIG. 21.

Figure 23:
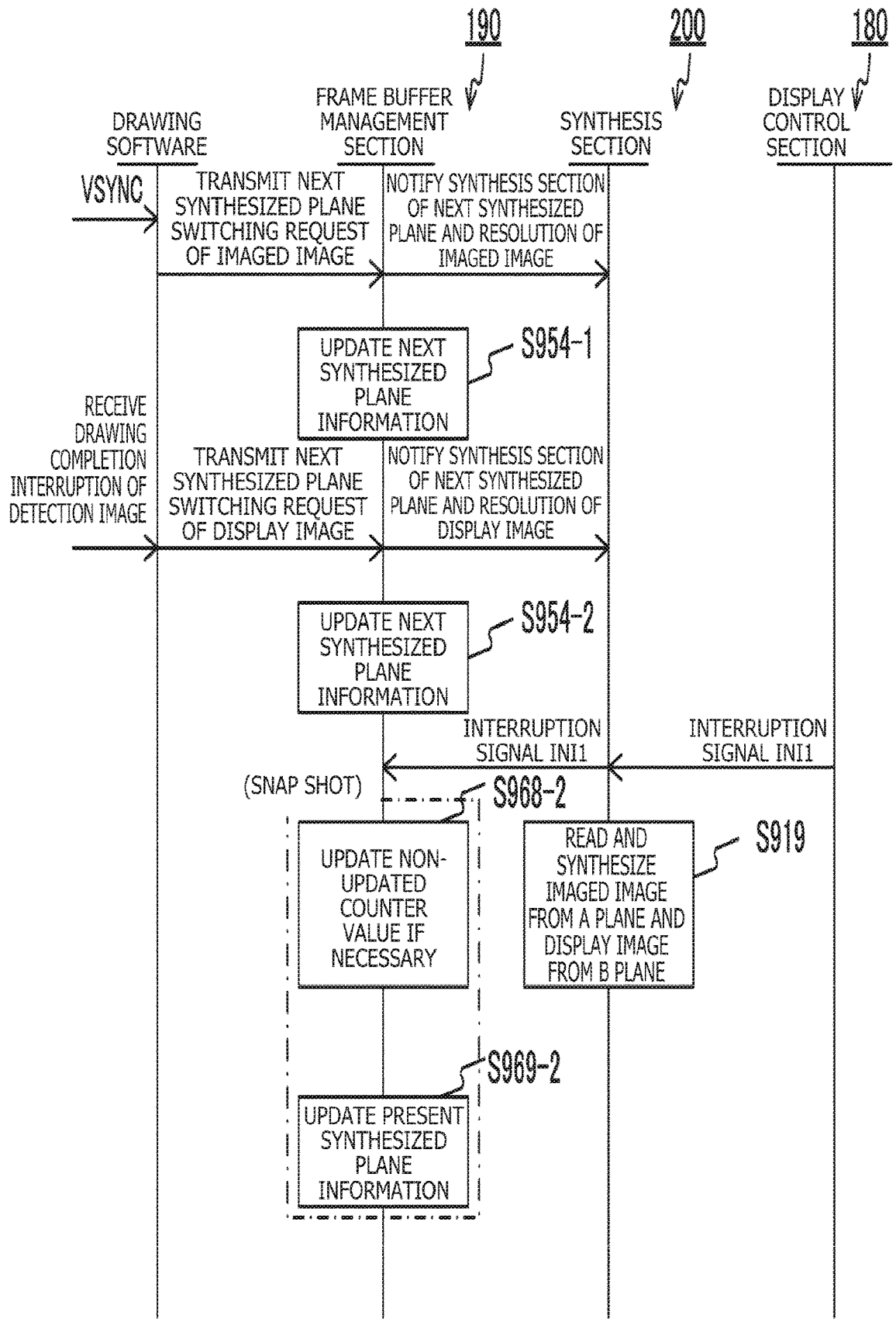
FIG. 23 is an example of a sequence diagram illustrating operations of the AR terminal according to the third embodiment of the present technology.

As exemplified in FIG. 23, in the next VSYNC illustrated in FIG. 22, it is assumed that the display control section 180 transmits the interruption signal INI1 for starting the synthesis after the drawing of the display frame is completed. In this case, the synthesis section 200 reads the imaged frame from the A plane and the display frame from the B plane and synthesizes them (step S919). That is, the present display frame is synthesized.

As described above, in a case in which the display frame is not generated by the timing of the interruption signal INI1, the past display frame and the imaged frame are synthesized.

Figure 24:
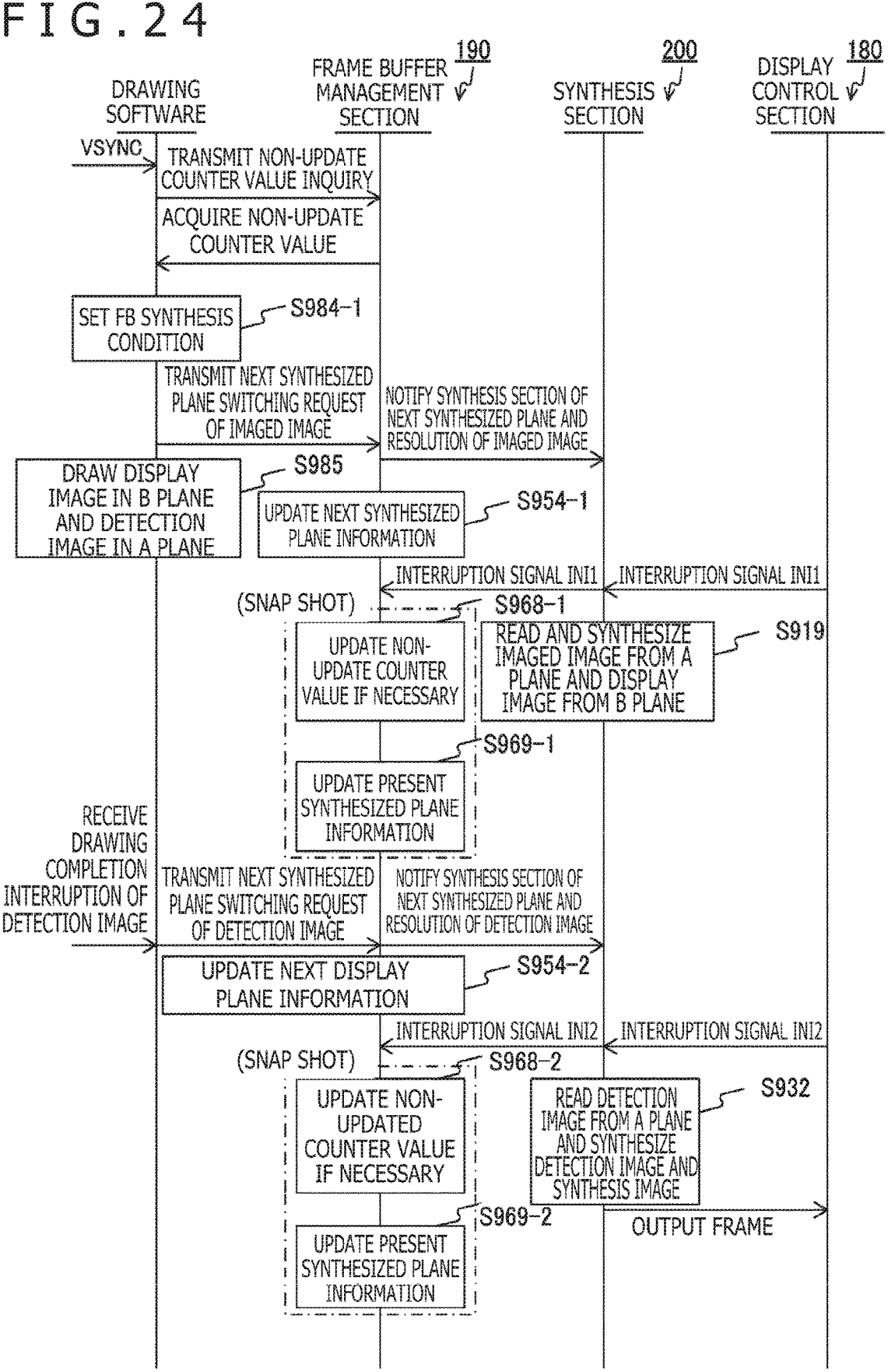
FIG. 24 is an example of a sequence diagram illustrating operations of the AR terminal when a frame buffer is not updated according to the third embodiment of the present technology.
Figure 25:
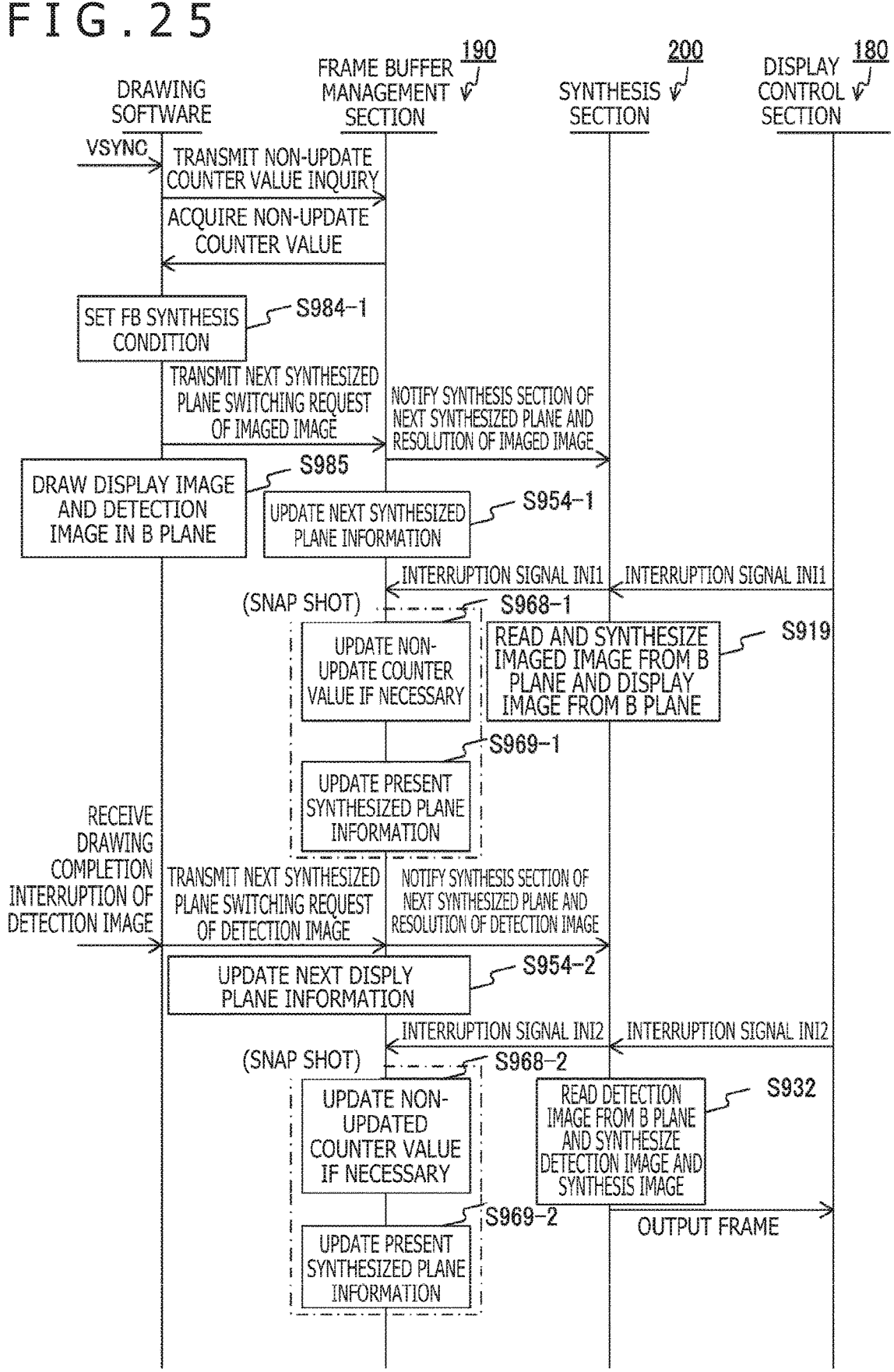
FIG. 25 is an example of a sequence diagram illustrating operations of the AR terminal when the frame buffer is not updated according to the third embodiment of the present technology.

FIGS. 24 and 25 each are an example of a sequence diagram indicative of operations of the AR terminal 100 when the frame buffer is not updated according to the third embodiment of the present technology.

It is assumed that the drawing software allows the drawing of the display frame (display image) to be interrupted. On this occasion, the drawing software does not transmit the FB synthesis condition change request to the frame buffer management section 190. Further, the drawing software does not transmit the next synthesized plane switching request of the display frame; therefore, the pieces of next synthesized plane information NF1 and NA1 of the display frame are not updated. For example, the synthesized plane of the display frame remains the B plane.

By contrast, the imaged frame (imaged image) is read from the A plane, for example, as exemplified in FIG. 24. Then, the next frame is read from the B plane as exemplified in FIG. 25. Further, a detection information frame is read from the A plane, for example, as exemplified in FIG. 24 and the next frame is read from the B plane as exemplified in FIG. 25.

The frame buffer management section 190 counts the non-update counter value C in synchronization with the vertical synchronizing signal VSYNC. The drawing software can calculate the frequency of updating (frame rate) of the frame buffer from the non-update counter value C. For example, the non-update counter value at a starting time point of a period to be monitored is set to $C(n)$ and the non-update counter value at a completion time point of the period is set to $C(n+1)$. In this case, a frame rate F notated by percentage is calculated by using the following formula.

$$F=100\times\{C(n+1)-C(n)\}/VN$$

In the above formula, VN is a value obtained by dividing the period to be monitored by the period of the vertical synchronizing signal VSYNC.

As described above, according to the third embodiment of the present technology, the AR terminal 100 adjusts the frequency of updating of each frame buffer of the frame to be synthesized. Therefore, the AR terminal 100 can suppress the image quality of a frame in which the above frames are synthesized from being reduced.

Note that the above-mentioned embodiments provide examples for embodying the present technology and the matters in the embodiments and the invention-specifying matters in the scope of claims are associated. Similarly, the invention-specifying matters in the scope of claims and the matters in the embodiments of the present technology, which are denoted by the identical names, have correspondence. It should be noted that the present technology is not limited to the embodiments and can be embodied by making various modifications to the embodiments without departing from its essence.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray disc (Blu-ray (registered trademark) Disc) can be used, for example.

Note that the effects described in the present specification are mere examples and should not be limited, and effects other than those described in the present specification may also be obtained.

Note that the present technology can also take the following configurations.

(1)

A display control apparatus including:

a first frame generation section configured to generate a first frame whenever a period of a predetermined synchronizing signal has elapsed;

a second frame generation section configured to in turn generate a predetermined number of second frames; and a synthesis section configured to synthesize, in a case in which a present frame that is the predetermined second frame is generated by specific timing, the present frame and the first frame and synthesize, in a case in which the present frame is not generated by the specific timing, as a past frame, the second frame before the present frame with the first frame.

(2)

The display control apparatus according to (1), in which the first frame includes an imaged frame imaged by a solid-state image sensing device.

(3)

The display control apparatus according to (1) or (2), in which the second frame includes a display frame that displays predetermined information.

(4)

The display control apparatus according to any one of (1) to (3), in which in a case in which the present frame is generated by the specific timing, the synthesis section starts processing for synthesizing the present frame and the first frame when the specific timing has elapsed.

(5)

The display control apparatus according to any one of (1) to (3), in which in a case in which the present frame is generated by the specific timing, the synthesis section starts the processing for synthesizing the present frame and the first frame when the present frame and the first frame are generated.

(6)

The display control apparatus according to any one of (1) to (5), in which the synthesis section further synthesizes a third frame with a synthesis frame in which the first frame and the second frame are synthesized.

(7)

The display control apparatus according to (6), in which the third frame includes a detection frame generated from a result in which a predetermined object is detected in the imaged frame.

(8)

The display control apparatus according to (6) or (7), further including:

a first frame buffer configured to retain the first frame;

a second frame buffer configured to retain the second frame;

a third frame buffer configured to retain the third frame; and a management section configured to measure each frequency of updating of the first, second, and third frame buffers, in which the synthesis section changes a synthesis condition on a basis of the measured frequency of updating.

(9)

The display control apparatus according to (8), in which the synthesis section acquires the past frame from the second frame buffer.

(10)

Electronic equipment including:

a first frame generation section configured to generate a first frame whenever a period of a predetermined synchronizing signal has elapsed;

a second frame generation section configured to in turn generate a predetermined number of second frames;

a synthesis section configured to synthesize, in a case in which a present frame that is the predetermined second frame is generated by specific timing, the present frame and the first frame and synthesize, in a case in which the present frame is not generated by the specific timing, as a past frame, the second frame before the present frame with the first frame; and a display section configured to display the synthesis frame.

(11)

A control method of a display control apparatus, including:

a first frame generation procedure for generating a first frame whenever a period of a predetermined synchronizing signal has elapsed;

a second frame generation procedure for in turn generating a predetermined number of second frames; and a synthesis procedure for synthesizing, in a case in which a present frame that is the predetermined second frame is generated by specific timing, the present frame and the first frame and synthesize, in a case in which the present frame is not generated by the specific timing, as a past frame, the second frame before the present frame with the first frame.

(12)

A program for causing a computer to execute:

a first frame generation procedure for generating a first frame whenever a period of a predetermined synchronizing signal has elapsed;

a second frame generation procedure for in turn generating a predetermined number of second frames; and a synthesis procedure for synthesizing, in a case in which a present frame that is the predetermined second frame is generated by specific timing, the present frame and the first frame and synthesize, in a case in which the present frame is not generated by the specific timing, as a past frame, the second frame before the present frame with the first frame.

REFERENCE SIGNS LIST

100 AR terminal
101 AR display control section
102 Display section
103 Solid-state image sensing device
110 Memory
111, 114, 115, 116 Frame buffer
120 Memory control section
130 CPU
135 GPU
140 Drawing section
141 Display information frame generation section
142 Detection information frame generation section
150 Bus
180 Display control section
190 Frame buffer management section
200 Synthesis section
210 Pre-stage image synthesis section
211, 212, 221, 222 Image reading section
213, 214, 223, 224 Image processing section
215 Synthesis frame generation section
216 Image writing section
217, 227 Synthesis control section
220 Post-stage image synthesis section
225 Output frame generation section
226 Display output section

The invention claimed is:

1. A display control apparatus, comprising:
a first frame buffer configured to retain a first frame;
a second frame buffer configured to retain a plurality of second frames;
a third frame buffer configured to retain a third frame; and
a central processing unit (CPU) configured to:
  generate the first frame based on elapse of a period of a synchronizing signal;
  generate, subsequent to the generation of the first frame, the plurality of second frames;
  synthesize a present frame and the first frame when the present frame is generated within a specific timing, wherein the present frame is a frame of the plurality of second frames;
  synthesize a past frame with the first frame when the present frame is not generated within the specific timing, wherein
    the past frame is the frame, of the plurality of second frames, before the present frame;

synthesize a third frame with a synthesis frame, wherein the first frame and the frame of the plurality of second frames are synthesized in the synthesis frame;
measure a frequency of updation of each frame buffer of the first frame buffer, the second frame buffer, and the third frame buffer; and
change a synthesis condition based on the measured frequency of updation.

2. The display control apparatus according to claim 1, wherein the first frame includes an imaged frame which is imaged by a solid-state image sensing device.

3. The display control apparatus according to claim 1, wherein the frame of the plurality of second frames includes a display frame that displays information.

4. The display control apparatus according to claim 1, wherein
the CPU is further configured to start processing for the synthesis of the present frame and the first frame, when the present frame is generated within the specific timing, and when the specific timing has elapsed.

5. The display control apparatus according to claim 1, wherein
the CPU is further configured to start processing for the synthesis of the present frame and the first frame, when the present frame is generated within the specific timing, and when the present frame and the first frame are generated.

6. The display control apparatus according to claim 1, wherein the third frame includes a detection frame generated based on a detection of an object in an imaged frame.

7. The display control apparatus according to claim 1, wherein the CPU is further configured to acquire the past frame from the second frame buffer.

8. An electronic equipment, comprising:
a first frame buffer configured to retain a first frame;
a second frame buffer configured to retain a plurality of second frames;
a third frame buffer configured to retain a third frame; and
a central processing unit (CPU) configured to:
  generate the first frame based on elapse of a period of a synchronizing signal;
  generate, subsequent to the generation of the first frame, the plurality of second frames;
  synthesize a present frame and the first frame when the present frame is generated within a specific timing, wherein the present frame is a frame of the plurality of second frames;
  synthesize a past frame with the first frame when the present frame is not generated within the specific timing, wherein
    the past frame is the frame, of the plurality of second frames, before the present frame;
  synthesize a third frame with a synthesis frame, wherein the first frame and the frame of the plurality of second frames are synthesized in the synthesis frame;
  measure a frequency of updation of each frame buffer of the first frame buffer, the second frame buffer, and the third frame buffer;
  change a synthesis condition based on the measured frequency of updation; and
  control display of the synthesis frame.

9. A control method of a display control apparatus, comprising:
generating a first frame based on elapse of a period of a synchronizing signal;
retaining the first frame in a first frame buffer;
generating, subsequent to the generation of the first frame, a plurality of second frames;
synthesizing a present frame and the first frame when the present frame is generated within a specific timing, wherein the present frame is a frame of the plurality of second frames;
synthesizing a past frame with the first frame when the present frame is not generated within the specific timing, wherein
  the past frame is the frame, of the plurality of second frames, before the present frame;
retaining the plurality of second frames in a second frame buffer;
synthesizing a third frame with a synthesis frame, wherein the first frame and the frame of the plurality of second frames are synthesized in the synthesis frame;
retaining the third frame in a third frame buffer;
measuring a frequency of updation of each frame buffer of the first frame buffer, the second frame buffer, and the third frame buffer; and
changing a synthesis condition based on the measured frequency of updation.

10. A non-transitory computer-readable medium having stored thereon computer-readable instructions, which when executed by a processor, cause the processor to execute operations, the operations comprising:
generating a first frame based on elapse of a period of a synchronizing signal;
retaining the first frame in a first frame buffer;
generating, subsequent to the generation of the first frame, a plurality of second frames;
synthesizing a present frame and the first frame when the present frame is generated within a specific timing, wherein the present frame is a frame of the plurality of second frames;
synthesizing a past frame with the first frame when the present frame is not generated within the specific timing, wherein
  the past frame is the frame, of the plurality of second frames, before the present frame;
retaining the plurality of second frames in a second frame buffer;
synthesizing a third frame with a synthesis frame, wherein the first frame and the frame of the plurality of second frames are synthesized in the synthesis frame;
retaining the third frame in a third frame buffer;
measuring a frequency of updation of each frame buffer of the first frame buffer, the second frame buffer, and the third frame buffer; and
changing a synthesis condition based on the measured frequency of updation.

* * * * *